(12) United States Patent
Kitts et al.

(10) Patent No.: US 12,361,436 B2
(45) Date of Patent: *Jul. 15, 2025

(54) SYSTEMS AND METHODS FOR ANALYZING DATA ELEMENT DISTRIBUTION ACROSS A NETWORK

(71) Applicant: ADAP. TV, INC., Dulles, VA (US)

(72) Inventors: Brendan Kitts, Seattle, WA (US); Dyng Au, Seattle, WA (US); Brian Burdick, Newcastle, WA (US); Al Lee, Seattle, WA (US); Amanda Powter, Seattle, WA (US); John Sobieski, Redmond, WA (US)

(73) Assignee: ADAP. TV, INC., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,041

(22) Filed: Sep. 28, 2021

(65) Prior Publication Data

US 2022/0020036 A1    Jan. 20, 2022

Related U.S. Application Data

(63) Continuation of application No. 16/676,826, filed on Nov. 7, 2019, now Pat. No. 11,144,936, which is a continuation of application No. 14/046,898, filed on Oct. 4, 2013, now Pat. No. 10,521,808.

(60) Provisional application No. 61/709,884, filed on Oct. 4, 2012.

(51) Int. Cl.
    *G06Q 30/0201*    (2023.01)

(52) U.S. Cl.
    CPC ............... *G06Q 30/0201* (2013.01)

(58) Field of Classification Search
    CPC ............... G06Q 30/0201; G06Q 30/0246
    See application file for complete search history.

(56) References Cited

U.S. PATENT DOCUMENTS

| | | |
|---|---|---|
| 7,729,940 B2 | 6/2010 | Harvey et al. |
| 7,949,561 B2 | 5/2011 | Briggs |
| 7,949,565 B1 | 5/2011 | Eldering et al. |
| 8,090,613 B2 | 1/2012 | Kalb et al. |
| 2004/0138956 A1 | 7/2004 | Main et al. |
| 2006/0010022 A1 | 1/2006 | Kelly et al. |

(Continued)

OTHER PUBLICATIONS

"Targeting Television Audiences using Demographic Similarity" Brendan Kitts, Liang Wei, Dyng Au, Stefanie Zlomek, Ryan Brooks, Brian Burdick Lucid Commerce (Year: 2010).*

(Continued)

*Primary Examiner* — Alexandru Cirnu
(74) *Attorney, Agent, or Firm* — Bookoff McAndrews, PLLC

(57) ABSTRACT

A processing device selects a population of persons and measures sales metrics from the population over a time period and measures an advertising weight over the time period. The processing device determines an effect that the advertising weight has on the sales metrics and additionally calculates values for a degree of targetedness for the advertisement to the population of persons. The processing device determines an effect that the degree of targetedness has on the sales metrics and generates a multi-dimensional model that measures the combined effects of the advertising weight and the degree of targetedness on the sales metrics.

20 Claims, 22 Drawing Sheets

(56) References Cited

U.S. PATENT DOCUMENTS

| | | |
|---|---|---|
| 2010/0121677 A1 | 5/2010 | An et al. |
| 2010/0145791 A1* | 6/2010 | Canning ............ G06Q 30/0246 |
| | | 707/610 |
| 2010/0287029 A1 | 11/2010 | Dodge et al. |
| 2011/0093324 A1 | 4/2011 | Fordyce et al. |
| 2012/0233505 A1 | 9/2012 | Acharya et al. |
| 2012/0278158 A1 | 11/2012 | Farahat |

OTHER PUBLICATIONS

Targeting Television Audiences using Demographic Similarity, Brendan Kitts, Liang Wei, Dyng Au, Stefanie Zlomek, Ryan Brooks, Brian Burdick, Lucid Commerce, 2010 IEEE International Conference on Data Mining Workshops (Year: 2010).

\* cited by examiner

Treatment area selector

Home > Experimental > Treatment Area Selector

| Factors | | Qty or Rev (feed) | Target percentile |
|---|---|---|---|
| Source | Art.Com | Targeting (CPM/TCPM/TRatio) | TRatio |
| Per Capita Weight | 3 | Per Capita Desired Rank | 0.5 |
| Geo Distance Weight | 3 | Geo Distance Desired Rank | 1 |
| Targeting (CPM/TCPM/TRatio) Weight | 3 | Targeting (CPM/TCPM/TRatio) Desired Rank | 0.5 |
| Cost Weight | 3 | Cost Desired Rank | 0 |
| Census Disparity Weight | 0.1 | Census Disparity Desired Rank | 0.5 |
| Sales Time Series Shape Weight | 0.1 | Sales Time Series Shape Desired Rank | 1 |
| Sales per capita Weight | 0.1 | Sales per capita Desired Rank | 0.5 |
| Sales Type | Qty | Sales per capita Min Date | |
| Census Disparity from US Avg Weight | 3 | Census Disparity from US Avg Rank | 0 |
| Candidate Areas to Select | 10 | Minimum TVHH | 10000 |
| | | Geo Area Type | DMA |
| Maximum TVHH | | Candidate Areas to Exclude | |
| Filter Previous Geo Areas Used | No | Number of Control Areas to Select | |
| Candidate Areas to Include | None | Control Census Weight | 0.25 |
| Control Geo Distance Weight | 3 | Show Additional Detail Tables | No |
| Control Correlation Weight | 5 | | |

Each factor target is defined at right. Cost function is avg (abs(t arg-actual))

☑ Null

Geos level

Control selection criteria

DMA / Zone / Advertising Patch Area / National / Zip Code

FIG. 12

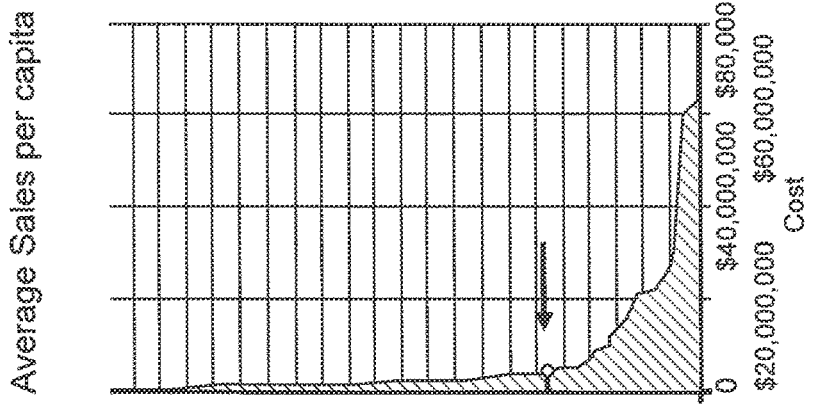
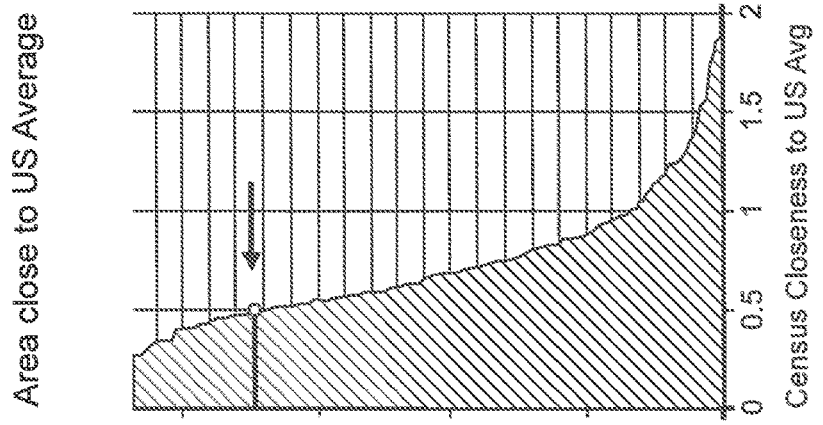
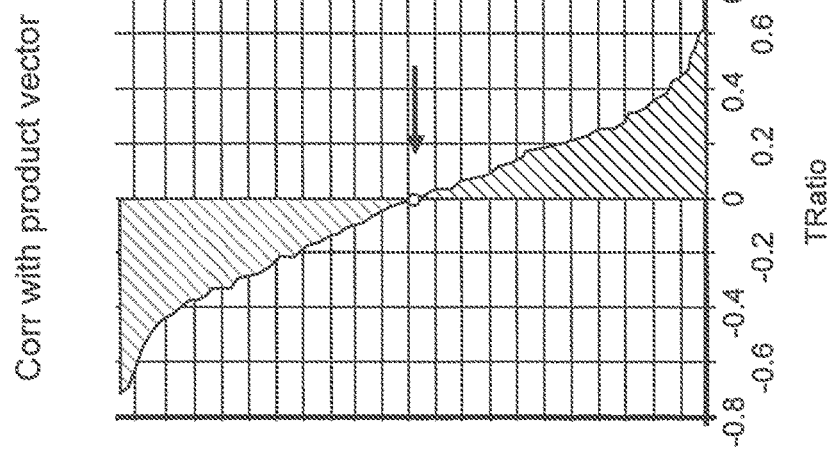
FIG. 14A

FIG. 15

| Home > Experimental > Lift Tracker | |
|---|---|
| Experiment | Sonicrafter Price Test |
| Number of Control DMAs to Select | 10 |
| Great Circle Distance Weight | 0.3 |
| Cable Penetration Weight | 0.1 |
| Exclude Previously Used Geo Areas | No |
| By Revenue or Qty | Qty |
| Control Geo Area | ALBANY, GA, ALEXANDRIA, LA, |
| Date End | 5/25/2011 |
| Break Out Treatment | No |

| | |
|---|---|
| Comparison | Weighting |
| Census Rank Weighting | 0.2 |
| Correlation Weight | 0 |
| Sales Channel | Overall |
| Revenue Source | Retail |
| Experimental Geo Area | ABILENE, TX - High Media |
| Date Start | |
| Break-out Control | |
| Add Normalized Values | |

- (Select All)
- ABILENE, TX - High Media High Price
- AUGUSTA, GA - High Media Med Price
- BANGOR, ME - High Media Med Price
- BEAMONT, TX - High Media Med Price
- BOISE, ID - Med Media VLow Price
- COLUMBUS, MS - No Media Med Price
- GAINESVILLE, FL - High Media VLow Price
- JOPLIN, MO - No Media VLow Price
- MONROE, LA - No Media VLow Price
- MONTGOMERY, AL - Low Media VLow Price
- PEORIA, IL - Low Media Regular Price
- TERRE HAUTE, IN - Low Media Med Price
- TRAVERSE CITY, MI - Med Media High Price

1500

SYSTEMS AND METHODS FOR ANALYZING DATA ELEMENT DISTRIBUTION ACROSS A NETWORK

CROSS-REFERENCE TO RELATED APPLICATIONS

This patent application is a continuation of and claims the benefit of priority to U.S. Nonprovisional patent application Ser. No. 16/676,826, filed Nov. 7, 2010, which is a continuation of U.S. Nonprovisional patent application Ser. No. 14/046,898, filed Oct. 4, 2013, now U.S. Pat. No. 10,521,808, issued Dec. 31, 2019, which claims the benefit of priority to U.S. Provisional Patent Application No. 61/709,884, filed Oct. 4, 2012, each of which is herein incorporated by reference in its entirety.

TECHNICAL FIELD

Embodiments of the present disclosure relate to the field of media advertising and, more particularly, to tracking and managing advertising campaigns.

BACKGROUND

Tracking return on investment (ROI) from television (TV) is an unsolved problem for advertising. There are no mechanisms that allow for tracking a viewer from a view event to a purchase in a store, dealership or over the web. This has led to many marketers being unable to allocate rational budgets towards TV advertising. There have been many attempts to track the revenue being generated from TV advertising. Some of these attempts are set forth below.
- A. IPTV—Many commentators have written that efforts such as internet protocol enabled television (IPTV) will eventually enable TV conversions to be tracked via conversion tracking pixels similar to those in place today throughout the web. IPTV s obtain their TV content from the internet and use hypertext transport protocol (HTTP) for requesting content. However, there are many technical challenges before tracking conversions using IPTV s becomes a reality. Today, only about 8% of US TV households have IP enabled TV. Attempts to introduce IPTVs such as Google® TV and Apple® TV have met with only lukewarm interest. Even if web-like conversion tracking becomes possible using TV, it still won't capture all of the activity such as brand recognition leading to delayed conversions, and purchasing at retail stores.
- B. RFI Systems—Some companies have experimented with methods for enabling existing TVs to be able to support a direct "purchase" from "the lounge" using present-day Set Top Box systems and remote controls. The QUBE® system, piloted in the 1970s, was an early version of this and allowed TV viewers to send electronic feedback to TV stations. Some system providers have developed an on-screen "bug" that appears at the bottom of the screen, and asks the consumer if they would want more information or a coupon. The consumer can click on their remote control to accept. Leading television content providers have also experimented with interactive capabilities. Although promising, adoption of remote control RFI systems is constrained by lack of hardware support and standards. These systems also have the same disadvantages of IPTV, in being unable to track delayed conversions.
- C. Panels—One of the most common fallbacks in the TV arena—when faced with difficult-to-measure effects—is to use volunteer, paid panels to find out what people do after they view advertisements. There are several companies that use panels to try to track TV exposures to sales. One advantage of this method is that it makes real-time tracking possible. However, in all cases, the small size of the panel (e.g., 25,000 people for some panels) presents formidable challenges for extrapolation and difficulty finding enough transactions to reliably measure sales. Another problem with the panel approach is the cost of maintaining the panels.
- D. Mix Models—If data from previous campaigns has been collected, then it may be possible to regress the historical marketing channel activity (e.g., impressions bought on TV ads, radio ads, web ads, print, etc.) against future sales. Unfortunately, such an approach offers no help if the relationships change in the future. Moreover, such an approach does not provide real time tracking. In addition, historical factors are rarely orthogonal—for example, retailers often execute coordinated advertising across multiple channels correlated in time on purpose in order to exploit seasonal events. This can lead to a historical factors matrix that aliases interactions and even main effects. Even if there are observations in which all main effects vary orthogonally, in practice there may be too few cases for estimation.
- E. Market Tests—Market Tests overcome the problems of mix models by creating orthogonal experimental designs to study the phenomena under question. TV is run in some geographic areas and not others, and sales then compared between the two. Market tests rely on local areas to compare treatments to controls. One problem typical to market tests is their inability to be used during a national campaign. Once a national television ad campaign is under way, there are no longer any controls that aren't receiving the TV signal of the ad campaign. This causes additional problems—for example, a market test might be executed flawlessly in April, and then a national campaign starts up in May. However, some external event is now in play during May, and the findings compiled meticulously during April are no longer valid. This is a problem of the market test being a "research study" that becomes "stale" as soon as the national campaign is started. Thus, market tests also fail to provide real time tracking.

None of the above methods or techniques are able to effectively track the effects of TV advertising on sales in multiple channels (e.g., retail sales, web sales, phone sales, etc.). Although television viewing may often result in customers that visit retail stores, purchase products, search on the web, or consult their mobile phones, these conversions (e.g., sales) are generally not linkable to the TV broadcast (e.g., to the TV advertisement). For the majority of advertisers, it may be difficult to link the customers' viewing of an ad to their decision to purchase later through a retail store or purchase on the web, because these purchases are not directly attributable to the TV broadcast (e.g., there is no direct link between the TV broadcast and the purchase). Moreover, none of the above techniques are able to perform real-time tracking across all advertiser sales channels without the use of panels.

SUMMARY

In one embodiment, an advertising (ad) campaign may be tracked in real-time using treatment groups and control groups to determine the effects of the advertising campaign. An experimental advertisement campaign (also referred to as a local ad campaign) may be introduced to a treatment group. The experimental advertisement campaign may run simultaneously with an existing advertising campaign (e.g., a national advertising campaign) in the treatment group. A control group, by contrast, may run only the existing advertising campaign. The demographics (e.g., the ages, nationalities, income levels, education levels, etc.) of the people in the treatment group and the people in the control group may be similar to each other (e.g., the variation in the demographics of the two groups may be within a certain threshold). In addition, the demographics of both the experimental region and the control region may be similar to the demographics of a larger region (e.g., a state, a country, etc.) to which the advertising campaign is applied. Alternatively, demographics between groups and/or regions may vary, but be applied to a model that accounts for such variations.

By measuring the change in sales or conversions that occur in the treatment groups when compared to the control groups, the effect of the experimental advertising campaign on sales within the treatment groups may be calculated. These effects may then be extrapolated to the larger region (e.g., to the state, to the country, etc.). This allows an advertiser to track, in real time, the effects of an advertising campaign for a larger geographic region (e.g., a state, a country), using smaller regions (e.g., the treatment groups and control groups).

In another embodiment, a multi-dimensional model (also referred to as a landscape) may be generated that models the effects of advertising weight (the amount of advertisements) and degree of targetedness (the probability that a sale of a product or service will be made as a result of a viewer being exposed to an advertisement) on an advertising campaign. The multi-dimensional model may be generated by establishing control groups and treatment groups that vary from the control groups either in degree of targetedness or advertising weight. Differences in sales metrics for each of the different treatment groups and control groups may be used along with the known degrees of targetedness and advertising weights associated with those treatment groups and control groups to develop the multi-dimensional model. The multi-dimensional model may then be used to perform real time tracking of an advertising campaign using control groups and/or treatment groups that have different degrees of targetedness and/or advertising weights from one another and/or from a larger region to which the advertising campaign is being applied.

In a further embodiment, the real-time tracking of the effects of an advertisement campaign and/or a multi-dimensional model generated for that advertising campaign may be used to modify and/or optimize the advertising campaign. Such modifications and optimizations may be performed in real time as the advertising campaign is being broadcast. The advertising campaign may be modified to meet one or more sales goals, such as a target advertising campaign cost, a target sales per impression, a target cost per conversion, etc. The advertising campaign may be modified by changing the advertising weight of the advertising campaign and/or the degree of targetedness for the advertising campaign. After modifying the advertising campaign, the effects of the modified advertising campaign can be tracked to determine whether the one or more sales goals are met.

The above is a simplified description of the disclosure in order to provide a basic understanding of some aspects of the disclosure. This description is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 12 illustrates various factors used by a treatment area selector, according to one embodiment.

FIGS. 14A-14B illustrate treatment area criteria and values for a hypothetical local campaign.

FIG. 15 illustrates a lift tracking report that shows treatment verses control over time and reports on the lift being generated, according to one embodiment.

DETAILED DESCRIPTION

Figure 1:
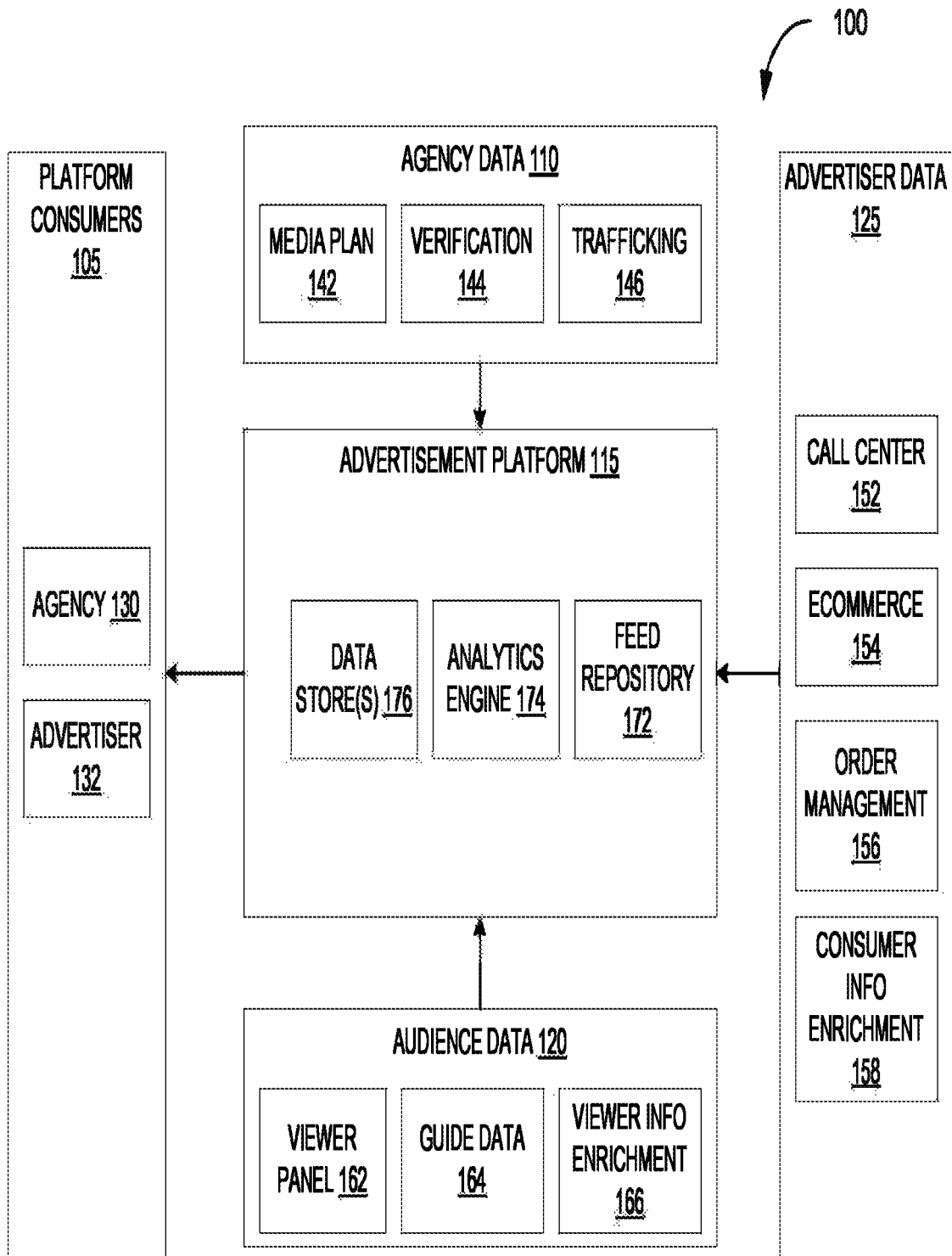
FIG. 1 is a block diagram of a system architecture in which embodiments of the present invention described herein may operate

Measuring the effects of TV advertising on purchases in a store or online is difficult. Providing systems and methods to track the effects of TV advertising may allow for better targeting, optimization, and control of advertisements because of visibility into their performance.

Some of the embodiments described herein provide systems and/or methods for measuring the effects of TV advertising campaigns (e.g., one or more TV advertisements/commercials) on multi-channel sales (e.g., on sales via stores, the internet, via the phone, etc.). The systems and methods may also allow a user to modify or optimize TV advertising campaigns based on advertising data (e.g., based on the results of the advertising campaign, such as the lift or increased sales). Additionally, the systems and methods described herein may generate multi-dimensional models (also referred to as a landscape) for an advertising campaign, which may be used to more accurately track and control the advertising campaign.

In some embodiments, existing cable, TV and/or satellite infrastructure may be used to identify and select treatment groups (also referred to as tracking cells, treatment areas or experimental regions) and control groups (also referred to as control areas, control cells or control regions). A group may be a combination of households that are capable of being served advertisements (e.g., broadcast regions, cable zones, geographic areas, demographic and/or other commonalities). Treatment groups are groups that will be used to run experiments, and control groups are groups that will be used as controls for comparison to the treatment groups. In one embodiment, the treatment groups and/or control groups "mirror" a larger region to which an existing ad campaign is being applied (e.g., a national region) in demographics, elasticity and/or other metrics. The treatment groups may be treated with a national advertising campaign as well as additional TV advertising (referred to as a local advertisement campaign or experimental advertisement campaign). The local or experimental ad campaign may be similar to what is occurring nationally from the national advertising campaign but at higher concentrations (e.g., more TV ads are displayed). This causes sales effects in the treatment groups to be greater in magnitude than the surrounding control groups, which may be exposed to just the national advertisement campaign.

Using advertising data collected in the treatment groups and the control groups, the systems and/or methods may extrapolate sales and cost performance of the local or experimental advertisement campaign to the national advertisement campaign. This extrapolation may encompass sales over multiple channels, including phone sales, online sales, brick and mortar retail sales, and so forth. For example, if product sales occur through retail stores, retail store performance in treatment groups are compared against control groups to determine an increase attributable to the additional TV advertising in the treatment groups. In another example, if the product is sold through the web, then increases in traffic with IP addresses coming from the treatment groups may indicate the impact of the TV advertisements on web sales (e.g., on purchases through a website). In a further example, if sales are coming in delayed, then post-advertising effects can be identified and residual lift in the treatment groups may be measured against the control groups.

Certain embodiments may provide a system and/or method for automatically selecting the above mentioned treatment groups and control groups. The system and/or methods may also automatically calculate an appropriate advertising weight to use for the local or experimental advertising campaign that is applied to the treatment groups in order to produce detectible lift in sales results over sales results of the national campaign.

Certain embodiments may also provide systems and/or methods that infer or create a landscape that encapsulates the measured behavior of the treatment groups. The landscape may be generated by using a set of treatment groups, some of which vary from the control groups by advertising weight and some of which vary from the control groups by degree of targetedness.

In addition, systems and/or methods provided in certain embodiments may allow users to define and meet several performance goals for the national advertising campaign. Performance goals may include, but are not limited to, cost per acquisition (CPA), a budget goal (e.g., a maximum budget), and a conversions goal (e.g., a target number of sales of a product or service). The systems and/or methods may automatically determine if the performance of an existing advertising campaign is below one or more performance goals and may adjust advertising media (e.g., TV advertisements) nationally and/or in treatment groups. Users may adjust the goal settings and/or provide other criteria to the system. The systems and/or methods may provide reports on whether the one or more performance goals were met.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Although references are made to a "national" advertising campaign, it should be understood that other size and types of advertising campaigns may be used. Examples of other classes of advertising campaigns include state wide advertising campaigns, city wide advertising campaigns, advertising campaigns targeting specific zip codes, and so forth. For example, consider a political advertiser that wants to do TV advertising for a Presidential election. The advertiser may be currently focusing on 11 battleground states, and may consider these states to be almost separate areas that the advertiser is trying to sway. One of the battlegrounds may be, for example, Ohio. For a campaign of this nature, mirrored tracking can be set up to provide information on how the Ohio campaign is performing. The treatment and control groups may be cable zones, which may be relatively small regions within Ohio. An advertising weight in the cable zones may be increased above that of the advertising campaign, but mirrored to the targeting (e.g., the degree of targetedness) for the larger campaign (which is Ohio). The result is that the cable zones—a set of well-selected local communities that match to the demographics of Ohio in general—become mirrors for the Ohio campaign. Based on the results in the cable zones, the advertiser can extrapolate how the advertising campaign is lifting Ohio in general.

In another example, certain retailers may only have stores in a limited number of states, and so the retailers may run TV advertisements in specific local areas. The retailers can buy local broadcast media throughout the states that they have stores in, and then may use cable zones within the state to provide for real-time mirrored tracking on how the stores within the state are performing.

FIG. 1 is a block diagram of a system architecture 100 in which embodiments of the present invention described herein may operate. The system architecture 100 enables an advertisement platform 115 (e.g., the Lucid Commerce®-Fathom Platform®) to collect data relevant to an advertising campaign, to set up experiments, to track an advertising campaign in real time, and to otherwise control an advertisement campaign. The system architecture 100 includes an advertisement platform 115 connected to platform consumers 105, agency data 110, audience data 120, and advertiser data 125.

The advertisement platform 115 receives as input the agency data 110, audience data 120 and advertiser data 125. The agency data 110 may include media plan data (e.g., data indicating advertisements to run, target conversions (e.g., number of sales), target audiences, a plan budget, and so forth), verification data 144 (e.g., data confirming that advertisements were run), and trafficking data 146 (e.g., data indicating what advertisements are shipped to which TV stations). Preferably, all the agency data 110 about what media is being purchased, run, and trafficked to stations is collected and provided to the advertisement platform 115 to ensure that there is an accurate representation of the television media. This may include setting up data feeds for the media plan data 142, verification data 144, and trafficking data 146.

The advertiser data 125 includes data on sales of products and/or services that are being advertised. Advertiser data 125 may include, for example, call center data 152, electronic commerce (ecommerce) data 154 and order management data 156. The advertisement platform 115 may set up a data feed to one or more call centers to receive accurate data about phone orders placed by the call centers for the advertised products or services. Additionally, recurring data feeds may be set up with the vendor or internal system of the advertiser that records orders that come in from the advertiser's website (ecommerce data 154). Recurring data feeds with the order vendor or internal system that physically handles the logistics of billing and/or fulfillment may also be established (order management data 156). This may be used for subsequent purchases such as subscriptions and for returns, bad debt, etc. to accurately account for revenue. This data may also originate from one or more retail Point of Sale systems.

The advertising platform 115 may generate a record for every caller, web-converter, and ultimate purchaser of the advertised product or server that gets reported via the advertiser data 125. The advertising platform 115 may append to each record the data attributes for the purchasers in terms of demographics, psychographics, behavior, and so forth. Such demographic and other information may be provided by data bureaus such as Experian®, Acxiom®, Claritas®, etc. In one embodiment, advertiser data 125 includes consumer information enrichment data 158 that encompasses such demographics, behavior and psychographics information.

Audience data 120 may include viewer panel data 162, guide service data 164 and/or viewer information enrichment data 166. The guide service data 164 may include the programming of what is going to run on television for the weeks ahead. The viewer information enrichment data 166 may be similar to the consumer info enrichment data 158, but may be associated with viewers of television programming as opposed to consumers of goods and services. A feed of such viewer data 166 may include demographic, psychographic, and/or behavioral data. This feed may be obtained using the purchases of products on television, set top box viewer records, or existing panels.

All of the feeds of the various types of data may be received and stored into a feed repository 172 by the advertisement platform 115. All of the underlying data may be put into production and all of the data feeds may be loaded into an intermediate format for cleansing, adding identifier's, etc. Personally Identifiable Information (PII) may also be extracted from the data feeds and routed to a separate pipeline for secure storage. The advertisement platform 115 may ingest all of the data from the data feeds. The data may be aggregated and final validation of the results may be automatically completed by the advertisement platform 115. After this, the data may be loaded into one or more data stores 176 (e.g., databases) for use with any upstream media systems. These include the ability to support media planning through purchase suggestions, revenue predictions, pricing suggestions, performance results, etc. Additionally, an analytics engine 174 of the advertisement platform 115 may use the data to set up experiments, perform real time tracking of an advertisement campaign, optimize an advertisement campaign in real time, determine a landscape for an advertisement campaign, and so forth. In one embodiment, the analytics engine 174 performs one or more of the methods described herein.

The platform consumers 105 may include an agency 130 (e.g., an advertising agency) and an advertiser 132 (e.g., a manufacturer of a product or service who wishes to advertise that product or service). Results of the real time tracking, advertisement optimization suggestions, advertising models (e.g., landscapes), etc. may be provided to the platform consumers 105 to enable them to fully understand and optimize their advertisement campaigns in real time or pseudo-real time (e.g., while the campaigns are ongoing).

Figure 2:
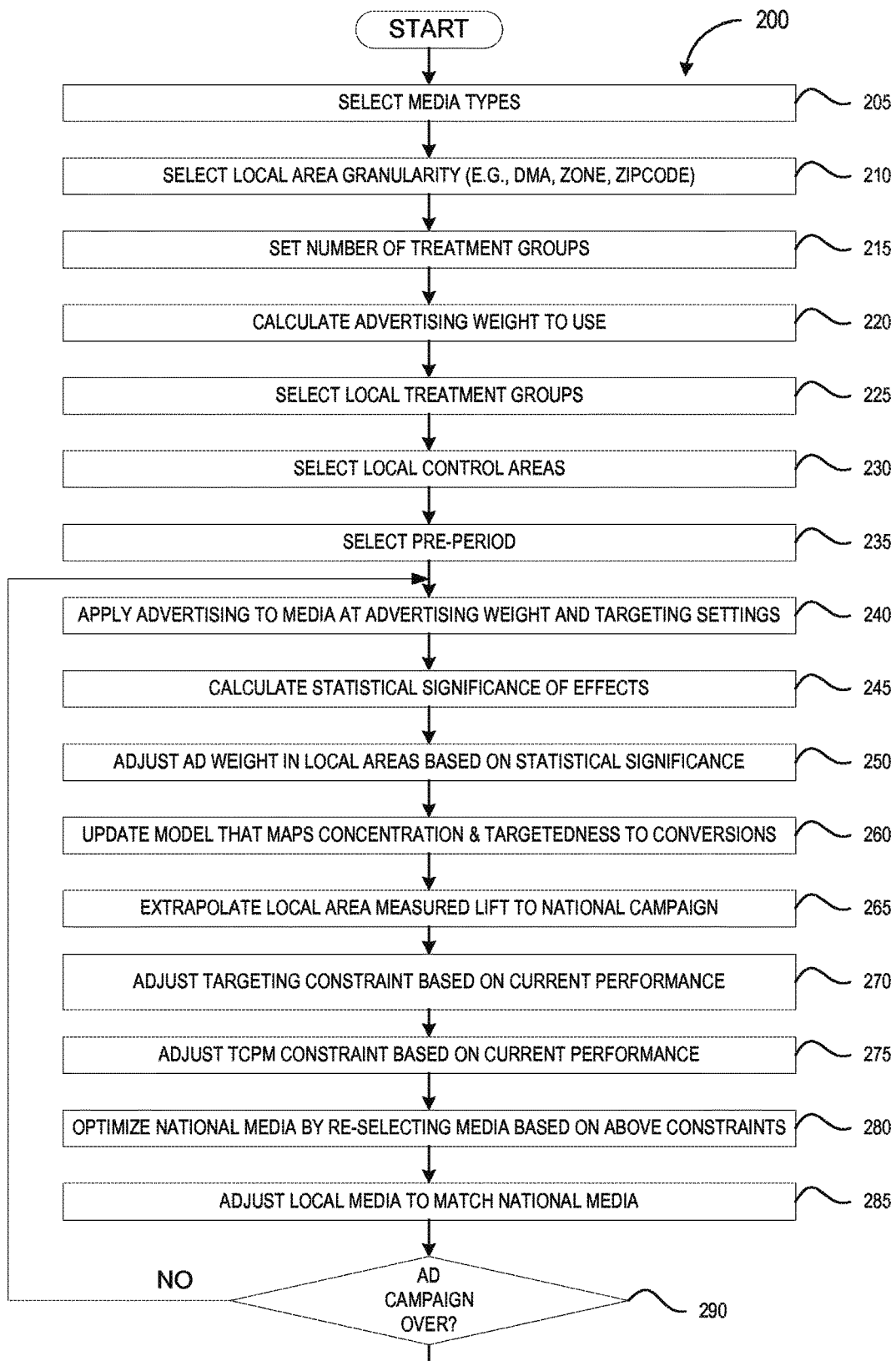
FIG. 2 is a flow diagram illustrating a method of tracking and managing an advertisement campaign, according to one embodiment.
Figure 19:
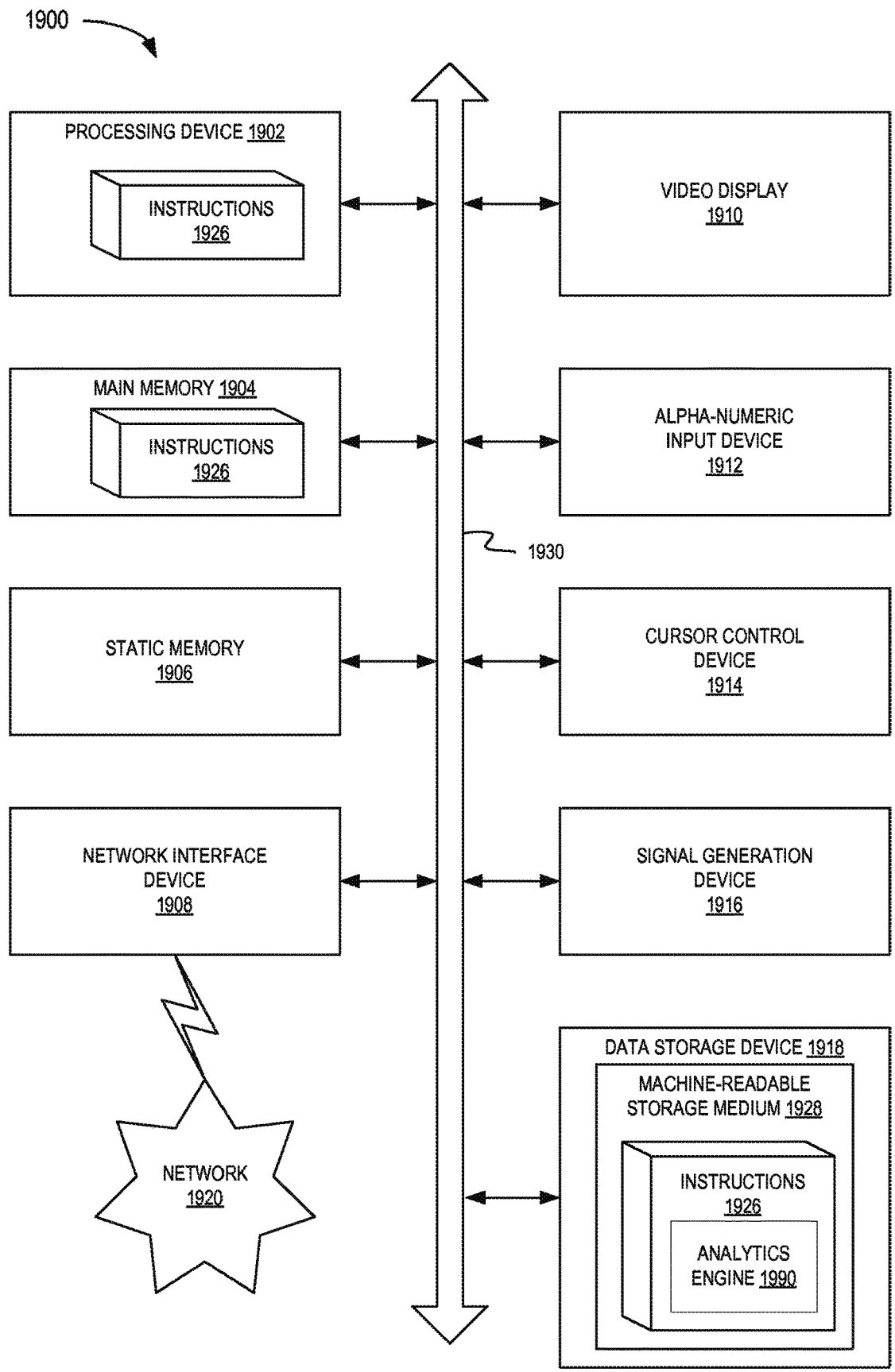
FIG. 19 illustrates a diagrammatic representation of a machine in the exemplary form of a computer system.

FIG. 2 is a flow diagram illustrating a method 200 of tracking and managing an advertisement campaign, according to one embodiment. The method 200 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to track and manage an advertisement campaign such as a national advertisement campaign. In one embodiment, method 200 may be performed by a processor, as shown in FIG. 19. In one embodiment, method 200 is performed by an advertisement platform (e.g., by analytics engine 174 of advertising platform 115 discussed with reference to FIG. 1).

Referring to FIG. 2, the method 200 starts by selecting media types that will be used for testing at block 205. Media types may include, but are not limited to: television, radio, billboards, magazines, newspapers, pay per click advertisements, banner advertisements, etc. Embodiments will be discussed herein with reference to television advertising for convenience. However, it should be understood that embodiments may also apply to advertising on other media such as radio, billboards, magazines, newspapers, and so forth. Preferably, the tested media type corresponds to a media type of an advertisement campaign currently under way or that is to be run.

At block 210, processing logic selects a group granularity (e.g., for treatment groups). The group may be a geographic cell or area. Different group granularities may include: designated market areas (DMAs), cable operator zones (e.g., an area serviced by a cable operator), 5-digit zip codes, 9-digit zip codes, street address, cities, states, counties, towns, etc. In one embodiment, the group granularities may be selected based on one or more conditions. For example, media selected should not overlap with each other at the selected granularity. In another example, the group granularity should be low enough to support the number of treatment groups that the user wants to field for testing. In a further example, the selected media types should be able to cover the geographic area specified by the granularity (e.g., TV generally can't route different advertisements to two different houses next to each other but TV can generally route different ads to different DMAs). In one embodiment, the types of media selected may affect the granularity of the groups. For example, TV advertisements (e.g., TV airtime) are generally purchased by DMAs, so DMA granularity may be used if TV is a selected media type. In another example, direct mail advertisements (e.g., flyers, brochures) may be purchased by zip code, so zip code granularity may be used for direct mail media. In a further example, billboards can be purchased at street addresses with a reasonable radius (e.g., 100 meters) for line of sight, so street address granularity may be used for billboards.

At block 215, processing logic sets a number of treatment groups. Treatment groups may be concentration cells (e.g., treatment groups used to track the effects of different concentrations of advertisements) and/or targeting cells (e.g., treatment groups used to track the effects of different targeting of advertisements). As the number of treatment groups increase, it is possible to create a more fine-grained landscape (although this may increase costs). The number of treatment groups can be developed heuristically or algorithmically. For example, 5 control groups and 2 treatment groups may be used in one embodiment.

At block 220, processing logic calculates an appropriate media concentration for the treatment groups. One factor which may affect the calculation of the media concentration may be the presence of existing national media (e.g., the presence of an existing national advertising campaign on TV). Because a national advertising campaign may already be in progress (as is often the case), it may be difficult to determine which cross-channel sales are being caused by existing national media and which are being caused by an experiment (e.g., the new advertising campaign). The sales which are caused by an existing advertising campaign may be referred to as "noise." Processing logic may calculate the appropriate media concentration in order for the results to be greater than noise (e.g., baseline sales or results) resulting from other advertising media that may be running already (e.g., an existing national advertising campaign on national TV).

In addition, other factors may also affect the calculation of the appropriate media concentration. One other factor may be a rarity of events. For example, if a conversion or sale is generated on average every 10 airings of an advertisement, then a station could easily have 0 sales or conversions just due to chance. Another factor is the variability of events. For example, if sales fluctuate between 0 and 800 per day, with a mean of 80, then sales of 100 for the day (which is 1.2× lift) may be due to chance. Products or services with higher standard deviations for spot sales may require a greater difference in means to ensure changes are statistically significant. Another factor is noise media. Noise media may be national media (e.g., a national advertising campaign) that continues to run during the experiment. For example, an experimental advertising campaign in a local area might generate around 2 conversions. However, if the national advertising campaign is running, it might generate an average of 100 conversions per day and typically vary between 80 and 120 conversions. With that amount of nationally-generated conversions and variation, 2 additional conversions may not be measurably different from noise. Another factor may be conversions or sales which result from other media channels (e.g., direct mail advertisements, web advertisements, etc.).

Processing logic may incorporate the above noise sources into a model to try to estimate the impressions needed to create a statistically detectable change. In order to generate enough impressions to produce a detectable lift in the local area of the experimental advertising campaign, processing logic may estimate the number of conversions that would be produced from each of these sources of noise, and then define statistical significance threshold.

Treatment-Control Experimental Design

Figure 3:
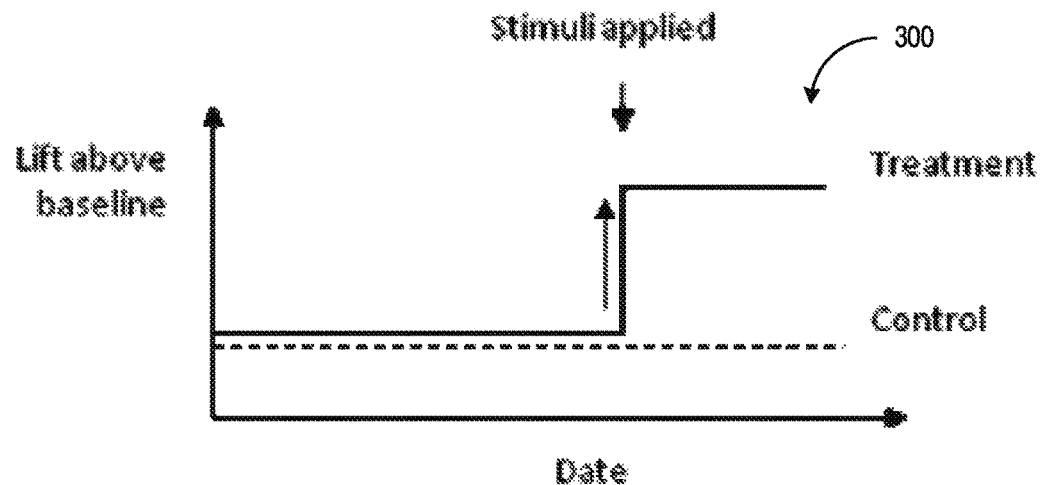
FIG. 3 is an exemplary graph illustrating a desired lift in sales above a base line level of sales that occurs when stimuli are applied to a treatment area or tracking cell, according to one embodiment.

FIG. 3 is an exemplary graph 300 illustrating a desired lift in sales above a base line level of sales that occurs when stimuli is applied to a treatment group (e.g., when TV advertisements are injected into a tracking cell or area), according to one embodiment. The solid line indicates sales of a product for a treatment group and the dashed line indicates sales of a product for the control group (e.g., an area where no advertising campaign is used or where the national advertising campaign is used). As shown in FIG. 3, when the stimuli is applied to the treatment group (e.g., when the experimental advertisement campaign starts to run), the amount sales increase from the baseline (e.g., the solid line lifts or rises above the dotted line).

Figure 4:
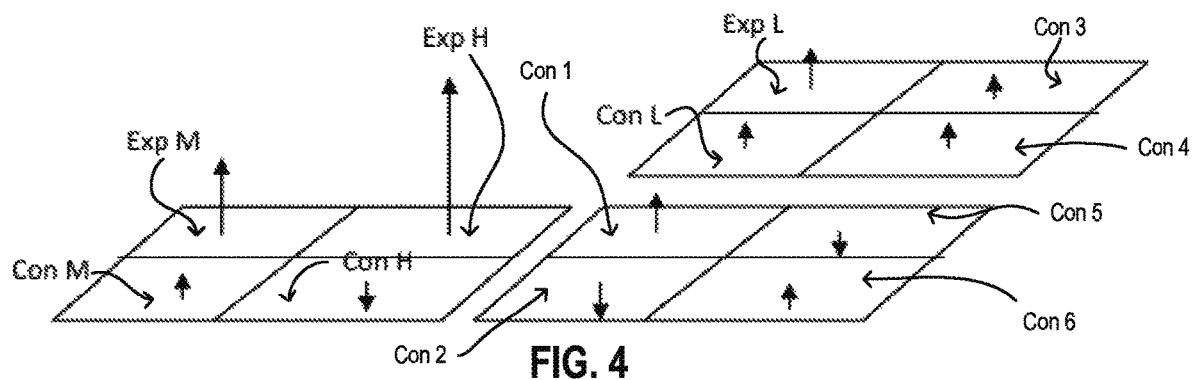
FIG. 4 illustrates different geographic regions which may be used to test different media concentration levels, according to one embodiment.

FIG. 4 illustrates different treatment groups (e.g., each quarter of the larger squares may represent a geographical region) which may be used to test different media concentration levels, according to one embodiment. Media concentration levels "L," "M," and "H" are tested in treatment groups Exp L, Exp H, and Exp M. For each treatment group, there is a corresponding control group Con L, Con H, and Con M. As shown in FIG. 4, each treatment group is associated with an upwards or downwards arrow, which indicates whether sales in the represented geographic region increased or decreased. For example, treatment group Exp L has an upwards arrow indicating that sales in that treatment group increased. The length of the arrows may indicate the amount of increase/decrease in sales (e.g., the longer the arrow, the more the increase/decrease). FIG. 4 also includes other control groups Con 1 through Con 6, that are not paired with a treatment group, but which may be used to help to identify overall trends.

Figure 5:
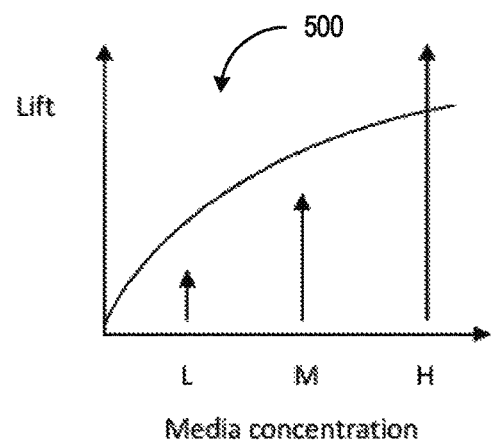
FIG. 5 is an exemplary graph illustrating the lift achieved for different media concentrations, according to one embodiment.

FIG. 5 is an exemplary graph 500 illustrating the lift achieved for different media concentrations, according to one embodiment. As shown in FIG. 5, there are three media concentrations, L, M, and H (representing by upwards arrows). Media concentration H results in the highest lift, media concentration M results in a lower lift, and media concentration L results in the lowest lift.

Impression Estimation

In this section we will discuss how to calculate how many impressions to apply to treatment areas in order to produce a lift that will be statistically detectable. In TV, advertisement media is often measured in Gross Rating Points (GRPs) per week, which is a measure of number of impressions that each US household would typically see from the ad campaign multiplied by 100; or alternatively Impressions per Thousand Households per Week (Imp/MHH/Wk) which is much the same but is impressions viewed per household multiplied by 1000. Assume that the advertiser has been running media in the past with a national GRP (GRPN) of 176 and that the advertiser may plan on four weeks of test or experimental media (e.g., W=4). The local area used as a treatment group may have 1.2 million TV households (e.g., $TVHH_L$) and there may be 112 million TV households (e.g., $TVHH_N$) nationally. The national impressions of the media ($I_N$) may be calculated as follows: $I_N=GRP_N*TVHH_N/100$. If an advertiser is aware of the sales per impression, then the advertiser may answer a questionnaire and indicate their $cpi_N$ value.

If the $cpi_N$ is not available, then the $cpi_N$ can be inferred or calculated from historical data. The cpi can be obtained inferred from the following formula:

$$C_N = cpi_N * I_N + C_{nomedia,N}$$

where $C_N$ is the conversions due to all sources per week, $I_N$ is the number of national impressions of media per week, and $C_{nomedia,N}$ is the number of conversions generated without any media. In one embodiment, $cpi_N$ and $C_{nomedia,N}$ may be calculated to minimize the squared error of observations of impressions and sales. For example, the following parameters may minimize the squared error based on exemplary historical data ($R^2=0.29$): $cpi_N=1/1408000$; $cpc_N=0$; $C_{nomedia,N}=66$.

The impressions experienced in the targeted local area due to national noise media ($I_{nat,L}$) may also be calculated. There may be three sources of conversions in the local area: (a) national noise conversions due to extant national advertising ($C_{nat,L}$), (b) conversions generated without media ($C_{nomedia,nat,L}$), and (c) conversions being generated due to experimental media ($C_{exp,L}$). $I_{nat,L}$, $C_{nat,L}$, $C_{nomedia,nat,L}$, and $C_{exp,L}$ may be calculated using the following equations:

$$I_{nat,L} = (TVHH_L/TVHH_N)*W*GRP_N*10*TVHH_N/1000$$

$$C_{nat,L} = cpi_N * I_{nat,L}$$

$$C_{nomedia,nat,L} = (TVHH_L/TVHH_N)*W*C_{nomedia,N}$$

$$C_{exp,L} = I_{exp,L}*W*cpi_N$$

Based on the impressions to be injected ($I_{exp,L}$), the expected lift in the experimental area may be calculated using the following equation:

$$\text{Lift}(I_{exp,L}) = \frac{C_{exp,L} + C_{nat,L} + C_{nomedia,nat,L}}{C_{nat,L} + C_{nomedia,nat,L}} = x$$

The statistical significance of the expected lift from running television can be estimated in several ways. A binomial probability distribution may be used to estimate the probability that the experimental media would result in this number of conversions, given a success rate equal roughly to the conversions per impression. The chance that the experimental media would result in a number of conversions (e.g., $Pr(\text{Lift}=x|\text{Impressions}=I_{exp,L})$) may be calculated using the following equation:

$$Pr(\text{Lift}=x|\text{Impressions}=I_{exp,L}) = \text{binopdf}(x*(C_{nat,L} + C_{nomedia,nat,L}), I_{nat,L} + I_{exp,L}, (C_{nomedia,nat,L} + I_{exp,L}*cpi_N)/I_{exp,L})$$

A normal probability density function may be used to estimate the probability (e.g., $Pr(\text{Lift}=x|\text{Impressions}=I_{exp,L})$) the number of expected conversions results from the injection of impressions ($C_{nat,L}+C_{nomedia,nat,L}+C_{exp,L}$) given the variability of conversions in the local area ($\sigma_l$). The standard deviation may be estimated empirically from the local daily conversions timeseries ($C_{d,L}$) which refers to the conversions generated on date d in local area L. In order for the normal probability density function to be used, a time series of historical conversions per day $C_{d,L}$ should preferably be available. The probability that the number of expected conversions results from the injection of impressions may be calculated using the following equations:

$$Pr(\text{Lift}=x|\text{Impressions}=I_{exp,L}) = \text{normpdf}(\mu_L + C_{exp,L}, \mu_L, \sigma_L)$$

$$\sigma_L = \text{sqrt}(\text{Var}(C_{d,L}))$$

$$\mu_L = C_{nat,L} + C_{nomedia,nat,L}$$

In one embodiment, the minimum local impression concentration that produces a statistically significant outcome <t is calculated using the following equation $$I_{exp,L}; \min Pr(\text{Lift}=x|\text{Impressions}=I_{exp,L}) < t$$

Table 1 below illustrates exemplary results using a binomial test. The impression concentrations are for 6 cells (two concentration low, two concentration medium, and two high concentration groups) and ranged between 628 and 1558, which suggested that cells would range between a lift of 1.1 and 1.2, and significance of 0.34 to 0.09. The table provides an exemplary number of impressions per thousand households that should be purchased in a given treatment group in order to produce a statistically significant lift.

Using these calculated significance levels, we can now select a necessary quantity of impressions that will need to be applied into our treatment area in order to produce a statistically significant lift. In one embodiment the system selects the lowest number of impressions that will exceed a user-defined significance threshold such as p<=0.10. In the example in Table 1, it suggests that impressions of 1,344 Imps/MHH/Wk would need to be applied to get better significance than p<0.10. The cost of those impressions would be approximately $387,000.

TABLE 1

| Estimated Lift and Significance for local area size of San Diego | | Imp/MlIII concentration (local area) per week | | | |
|---|---|---|---|---|---|
| Imp/MHH concentration (local area) per week | | 10 | 510 | 927 | 1344 |
| Cost all up for all cells (full period) | | $3,000 | $147K | $267K | $387K |
| Expected Conversions due to media (full period) | | 0.04 | 1.74 | 3.16 | 4.58 |
| Expected National Noise conversions (full period) | | 6.00 | 6.00 | 6.00 | 6.00 |
| Expected National Non-Media conversions (full period) | | 19.80 | 19.80 | 19.80 | 19.80 |
| Expected Conversions lift % in area due to media | | 1.0 | 1.1 | 1.1 | 1.2 |
| Statistical Significance of Results: If Media performs at 0x, 1x or 2x, probability that this would occur at random. 3x is useful for ensuring that an effect is detectable. Assets at 3x would be known good performers | 0 | 0.60060 | 0.34614 | 0.19255 | 0.09755 |
| | 1 | 1.00000 | 0.34614 | 0.19255 | 0.09755 |
| | 1.5 | 1.00000 | 0.34614 | 0.19255 | 0.09755 |
| | 2 | 1.00000 | 0.48979 | 0.19255 | 0.09755 |
| | 3 | 1.00000 | 0.48979 | 0.19255 | 009755 |

Figure 11A:
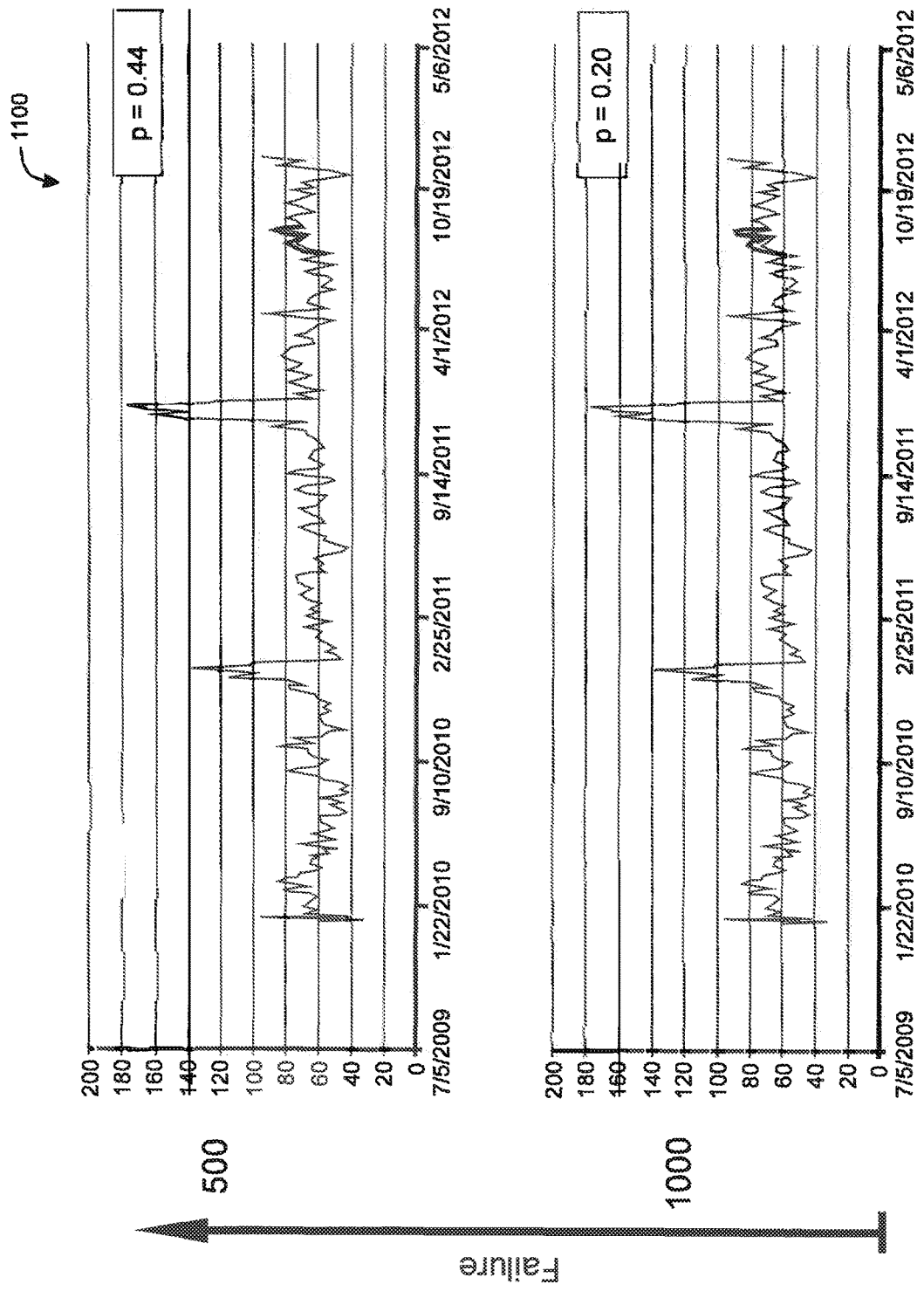
FIGS. 11A-11B illustrate the application of impressions to a hypothetical campaign, according to one embodiment.
Figure 11B:
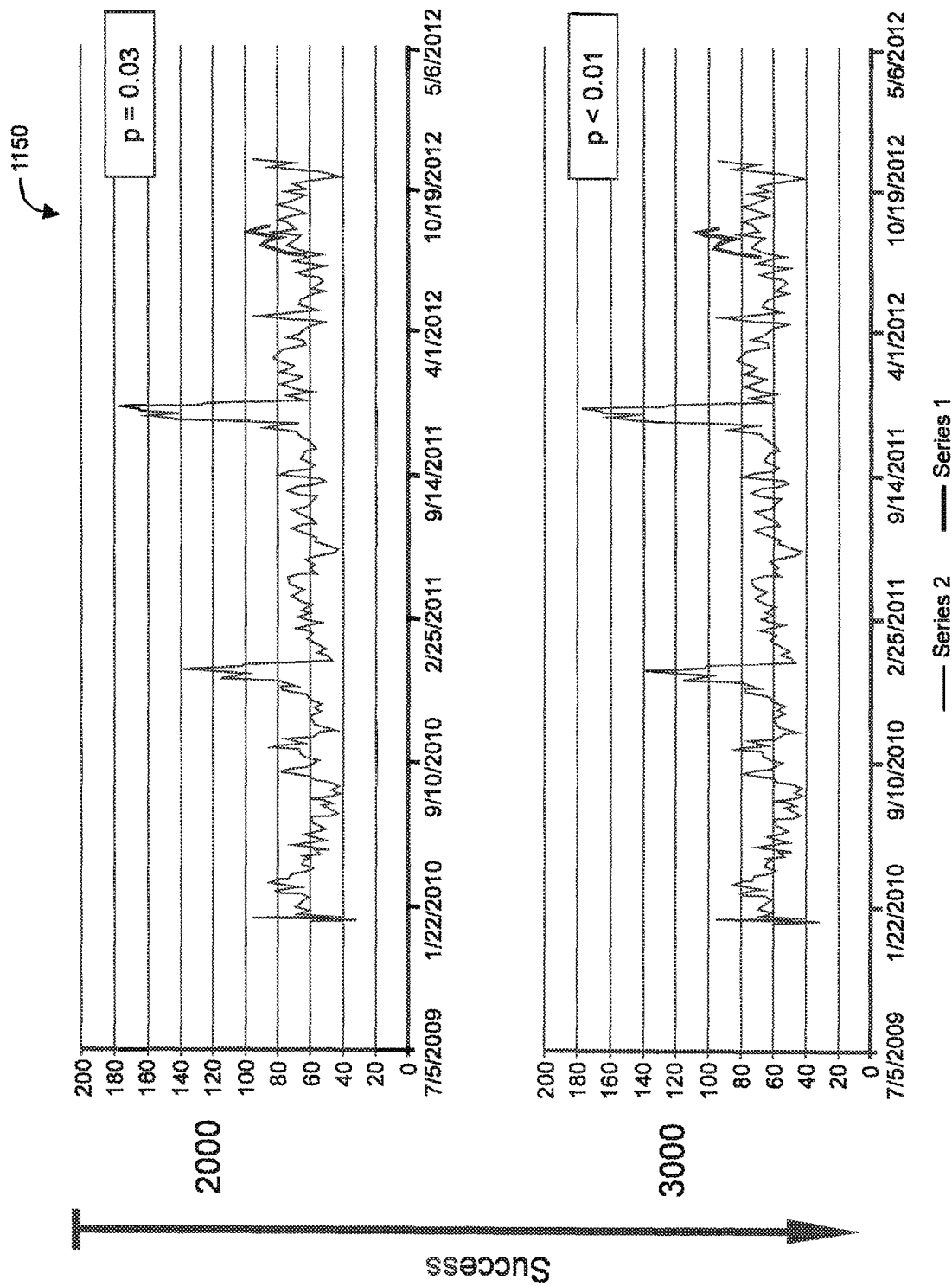

FIGS. 11A-11B illustrate the application 1100, 1150 of impressions to a hypothetical campaign, according to one embodiment. Injection levels and outcome on a time series are shown. A success or failure is indicated based on whether a change induced by a particular injection level would be statistically significant. As shown, p<0.05 may be used as a threshold for determining whether injection levels are statistically significant in one embodiment. In the example market, and injection level of 1800 impressions per million households per week (imp/mhh/wk) or above achieves, the p<0.05 threshold.

Treatment Area Selection

Referring back to FIG. 2, at block 225, processing logic selects treatment groups. In one embodiment, local geographic areas are selected for the treatment groups. In one embodiment, in order for a geographic area to be selected for a treatment group, the geographic area should not have different factors when compared to factors of other geographic areas already selected for treatment groups or control groups. The factors may include, but are not limited to, pricing, promotions, in-store displays, coupons, direct mail campaigns, newspaper advertising, email, and local TV advertising. Because there may be a large number of local geographic areas available (e.g., there are thousands of ZIP codes, cities, streets, etc., within the United States alone) and promotions are often run nationally and affect markets roughly equally, it is generally possible to identify areas that do not have different characteristics. Selecting multiple geographic areas that have the same factors and applying the same experimental treatment (e.g., same advertising weight) to these areas may increase the probability that changes in sales are due the experimental treatment (e.g., the local ad campaign). For example, if two areas are similar and the same experimental treatment is applied to both areas, and both areas lift in the same manner, then this increases the likelihood that the changes are due to the experimental treatment, in addition to improving the reliability of the lift estimation. Replication may help to increase the reliability of the results. Multiple replications may be used to increase statistical validity and to better measure the effects of an experimental treatment.

FIG. 12 illustrates a user interface 1200 showing various factors used by a treatment area selector, according to one embodiment. Any of the illustrated factors may be adjusted by a user via the user interface.

There are two general ways for selecting treatment groups: 1) using average areas, or 2) using behaviorally distinct areas.

Treatment Area Selection for National Average Extrapolation

When selecting treatment groups using average areas, processing logic may create a goodness function which measures averageness of sales, geographic dispersion, and averageness of population. Areas may be selected on the basis of being as "average as possible" for a business. When extrapolating to the national level, biases between the local area and national are minimal, and it is possible to scale-up by multiplying by the ratio of TV households in national to the area selected.

Multiple factors may be used when selecting average areas. The first factor may be sales per capita. If a candidate area has sales per capita (e.g., SalesPerCapita(L)) that are higher than the national average, then it is possible that the area in question might have advertising elasticities which are also different. In order to introduce fewer assumptions or differences into the design, processing logic may use areas which have sales per capita close to the national average. The sales per capita may be obtained using the following equation:

$$\text{SalesPerCapita}(L) = |C_L/\text{TVHH}_L - C_N/\text{TVHH}_N|$$

A second factor for selecting treatment groups may be the geographic dispersion (e.g., GeoDispersion(L1)) from other experimental areas. In one embodiment, it may be important to avoid testing too many areas which are too close together. Multiple treatment groups all in the same general geographic area increases the possibility that some unique factor in this particular region may be influencing sales and elasticities. By spreading out the treatment groups over a wider area, this possibility can be reduced. The geographic dispersion for an area L1 may be obtained using the following equation:

$$\text{GeoDispersion}(L1) = \min \text{EarthSurfaceDistance}(L1, L2)$$

where min EarthSurfaceDistance(L1,L2) is the minimum separation between two areas L1 and L2.

A third factor for selecting treatment groups may be the geographic size of a region (e.g., GeoSize(L)). Smaller areas are typically cheaper to use. However, with very small areas, there may be too few people in order to achieve statistically significant results. The statistical significance of any sized area can be calculated using the following equation:

$$\text{GeoSize}(L) = \text{TVHH}_L/\text{TVHH}_N$$

A fourth factor for selecting treatment groups may be the cost for a geographic area (e.g., Cost(L)). Cheaper areas allow for more media to be run for the same price. The product of the geographic size and CPM provides the cost of the experiment. Areas with cheaper CPMs may be preferred, assuming that other factors of the areas are the same. The cost may be obtained using the following equation:

$$Cost(L) = TVHH_L * CPM(L)/1000$$

A national advertisement campaign may inject a particular amount of impressions, $I_N(N)$, into all national areas. Such impressions may be performed by purchasing a collection of media assets or media asset patterns. A media asset pattern is a block of media that may be purchased for an advertisement, such as a rotator (e.g., M-F 6 PM-9 PM CNN) or a program (e.g., "The Family Guy"). Each media asset pattern may have multiple media asset pattern instances, each of which may correspond to a specific impression, airing or advertising event. For example, a media asset pattern instance may be Tuesday 8:05 PM on a specific channel.

In one embodiment, the probability of buyer (e.g., the tratio) is calculated based on the TV programming mix that the individual is watching (e.g., using a direct targeting method). For example, the tratio may be calculated by determining all the programs viewed by a user and summing up the buyers in that pool and dividing by the viewers. This may indicate the probability of conversion given someone watching exactly the same TV programming mix as the individual. In one embodiment, the direct targeting method may calculate the tratio as follows:

$$tratio(i) = \frac{\sum_p B(m)}{\sum_p V(m)} : m \in M(i)$$

where i is an individual viewer (e.g., individual Set Top Box viewer) who is being scored, m is one of the media programs in the set of media $M(i)$ which viewer i has watched, $B(m)$ is the number of buyers viewing media program m, and $V(m)$ is the universe of all viewers of media m.

In another embodiment, demographic targeting may be used to calculate tratio. The demographic targeting method may decompose each individual viewer into a multi-element demographic variable-value vector I (e.g., a vector which includes elements such as age, income, ethnicity, etc.). In one embodiment, the vector may have any number of elements (e.g., 400, 200, etc.). The user's demographics may be compared to the demographics of purchasers of the advertiser's product P. The demographic targeting method may work across all possible TV programs, regardless of the scarcity of buyers in the population. The demographic targeting method may calculate the tratio as follows:

$$tratio(i) = \frac{P \cdot I}{\|P\| \cdot \|I\|}$$

A project ("p") may refer to a product advertisement that an advertiser would like to run on TV. Both the media asset m and the project p may be recoded into a demographic vector representing the persons who view the media and the people who have bought the product or service being advertised. For convenience, Corr(m,p) is projected onto a 0 . . . 1 scale where 1 is most similar and 0 is not similar. As Corr(m,p) approaches 1, the probability that the two distributions come from the same distribution may also approach 1. Several measures of distribution similarity between m and p may be used such as a p-value based on a chi-square test, or inverse Sigmoid Euclidean distance, or correlation coefficient (max (correlationcoefficient,0)). The choice of distribution similarity function is one that can be made empirically.

A sixth factor for selecting treatment groups may be the census disparity from the United States (US) average (e.g., CensusDisparityFromUSAverage). The census disparity from the US average may be the mean absolute difference between the US population census demographic average and the demographic vector of a particular region. A lower value for the census disparity may be better since this may indicate that the area is not greatly different from the US average.

Using the above factors, a weighted "goodness" score may be calculated using the following formula:

$$Goodness(L) = W_1 \cdot Cost + W_2 \cdot MinGeoDispersion + W_3 \cdot SalesPerCapita + W_4 \cdot tratio + W_5 \cdot CensusDisparityFromUSAvg + W_6 \cdot ExpectedSignificance$$

where $W_1$ through $W_6$ are weight factors to apply to each of the variables that are used to compute the goodness function.

Figure 13A:
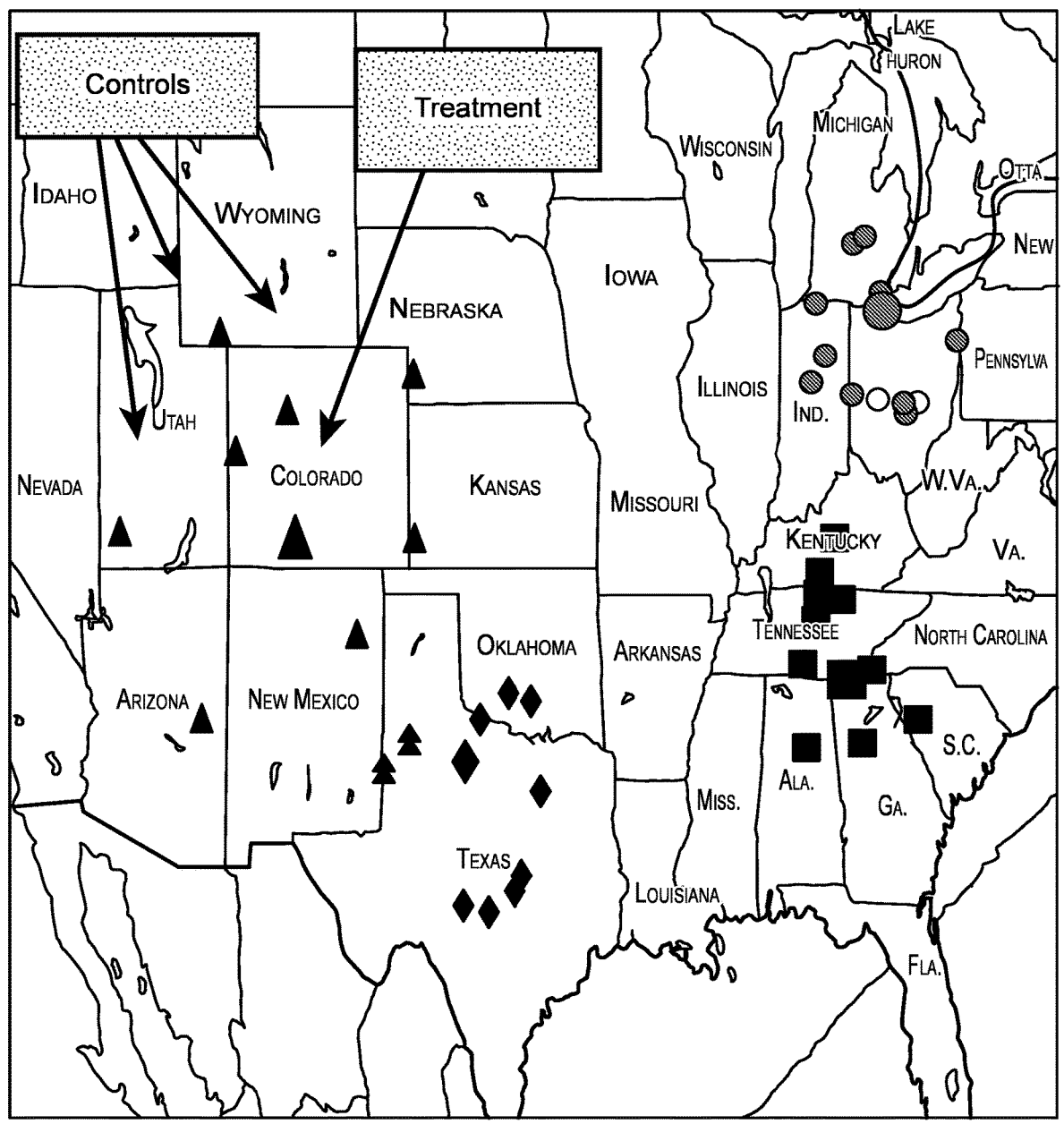
FIG. 13A illustrates treatment areas and control areas for a hypothetical local campaign, according to one embodiment.
Figure 13B:
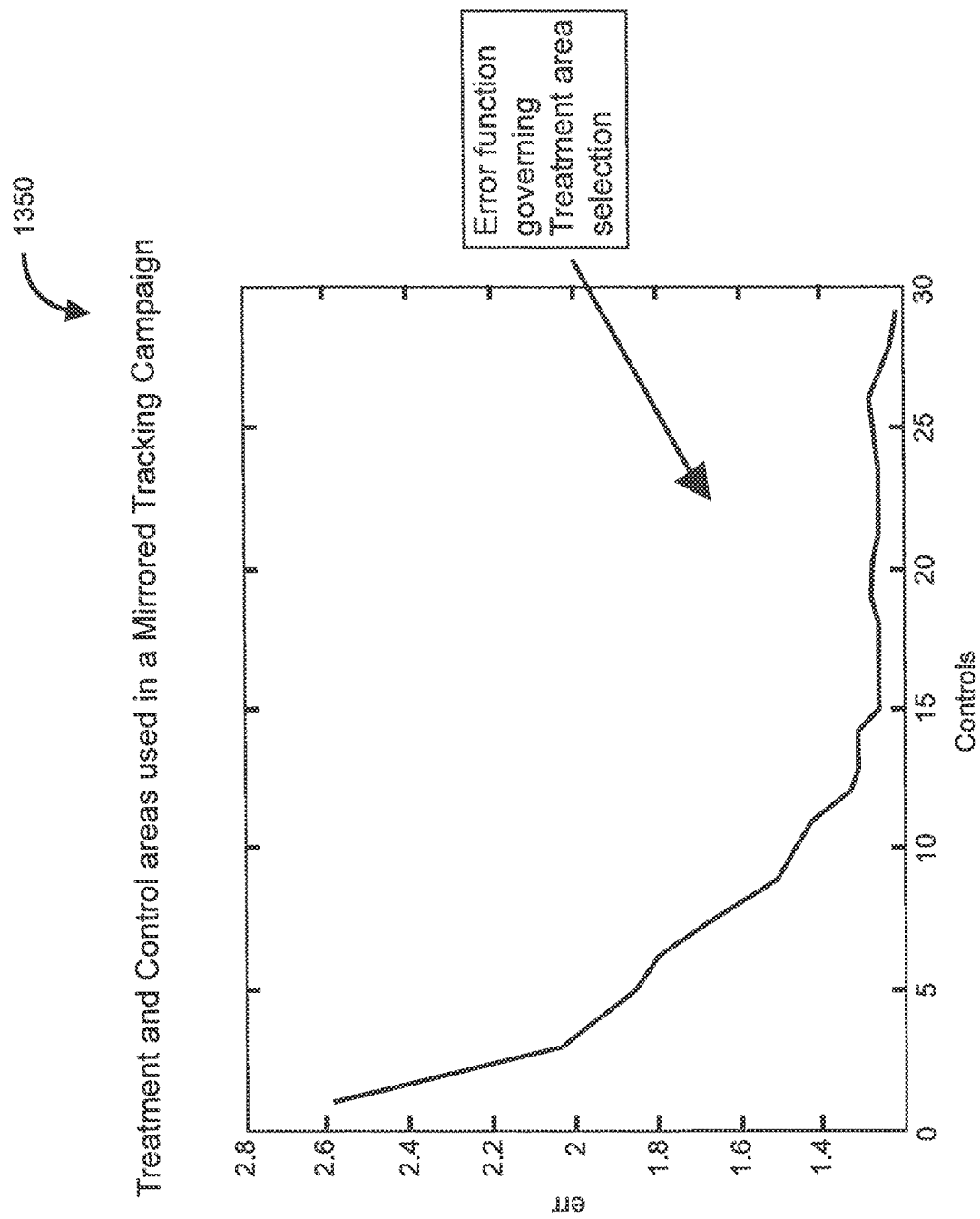
FIG. 13B illustrates control area selection fitness function, according to one embodiment.
Figure 14B:
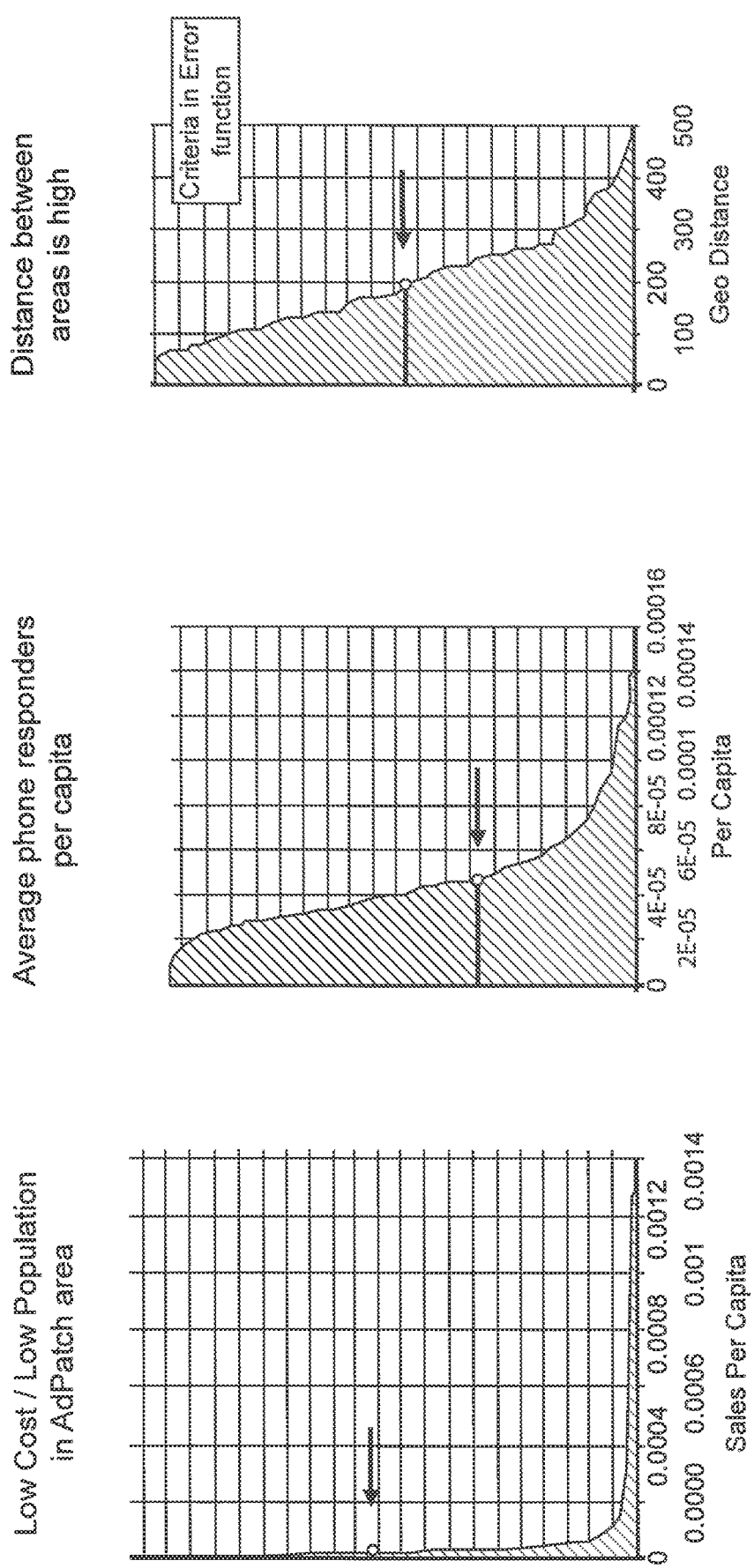

FIG. 13A illustrates treatment areas and control areas for a hypothetical local campaign, according to one embodiment. These treatment areas and control areas may be selected according to the techniques discussed herein. FIG. 13B illustrates control area selection fitness function 1350, according to one embodiment. FIGS. 14A-14B illustrate treatment area criteria and values for a hypothetical local campaign.

Treatment Area Selection for Extrapolation of Behaviorally Distinct Areas

As discussed above, processing logic may also select treatment groups using behaviorally distinct areas. It may be appropriate to use behaviorally distinct areas in cases where an advertiser behaves differently in different geographic regions. For example, winter may arrive earlier and last longer in higher latitude areas, leading to a longer season for winter products. In another example, the southwest of a country may have more desert regions and garden equipment needs may be different. Rural areas may have a different appetite for products than urban areas. If these differences are large then they can be addressed by creating "sub-models" for each area and then extrapolating.

Processing logic may define a set of contiguous geographic areas $x_i = (lat_i, lon_i)$ each of which includes a vector of measurements of some business metrics of interest $y_i$. Processing logic may find centroids $c_j = (lat_j, lon_j)$ and surrounding polygons such that the variation of $y_i$ vectors of the geographic areas that are closest to it (forming this contiguous region) are minimized. Processing logic may find the centroids $c_j$ using the following formula:

$$c_{1\ldots n}: \min \sum_{1,n} \sum_i (y_i - E[y])^2: \forall\, i\ \min\ EarthSurfaceDist(x_i, c_j)$$

Processing logic may find n contiguous regions of the US Map which have $y_i$ readings that are fairly similar. This may quantize the US map into areas which are behaviorally similar to each other. Because the lat-lon coordinates of the regions are unrelated to the behavioral vectors y and the relationship between the two are unknown, processing logic may use a stochastic algorithm to find the best centroids.

Figure 6:
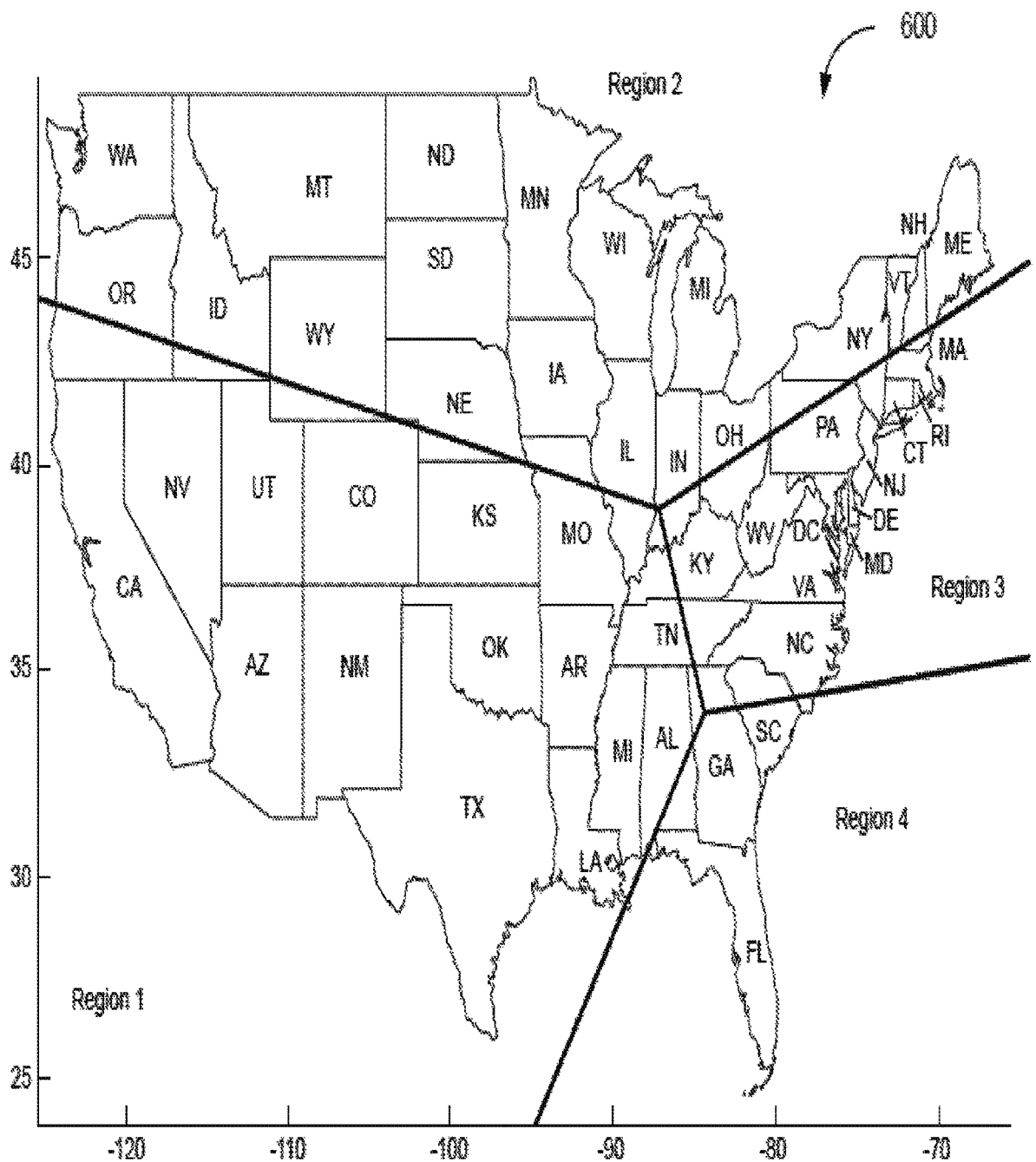
FIG. 6 illustrates an exemplary map that divides the US into regions which have similar sales revenues.

FIG. 6 illustrates an exemplary map 600 after the US has been divided into regions which have similar sales revenues.

The US map is divided into 4 regions based on revenues. Region 1 includes the west and southwest portions of the US and indicates areas of relatively low income. Region 2 includes the northern portion of the US and indicates areas of very low revenue. Region 3 includes New York and central eastern states and indicates areas of very high revenue. Region 4 includes Florida and the southeaster portion of the US and indicates areas of low revenue.

Figure 7:
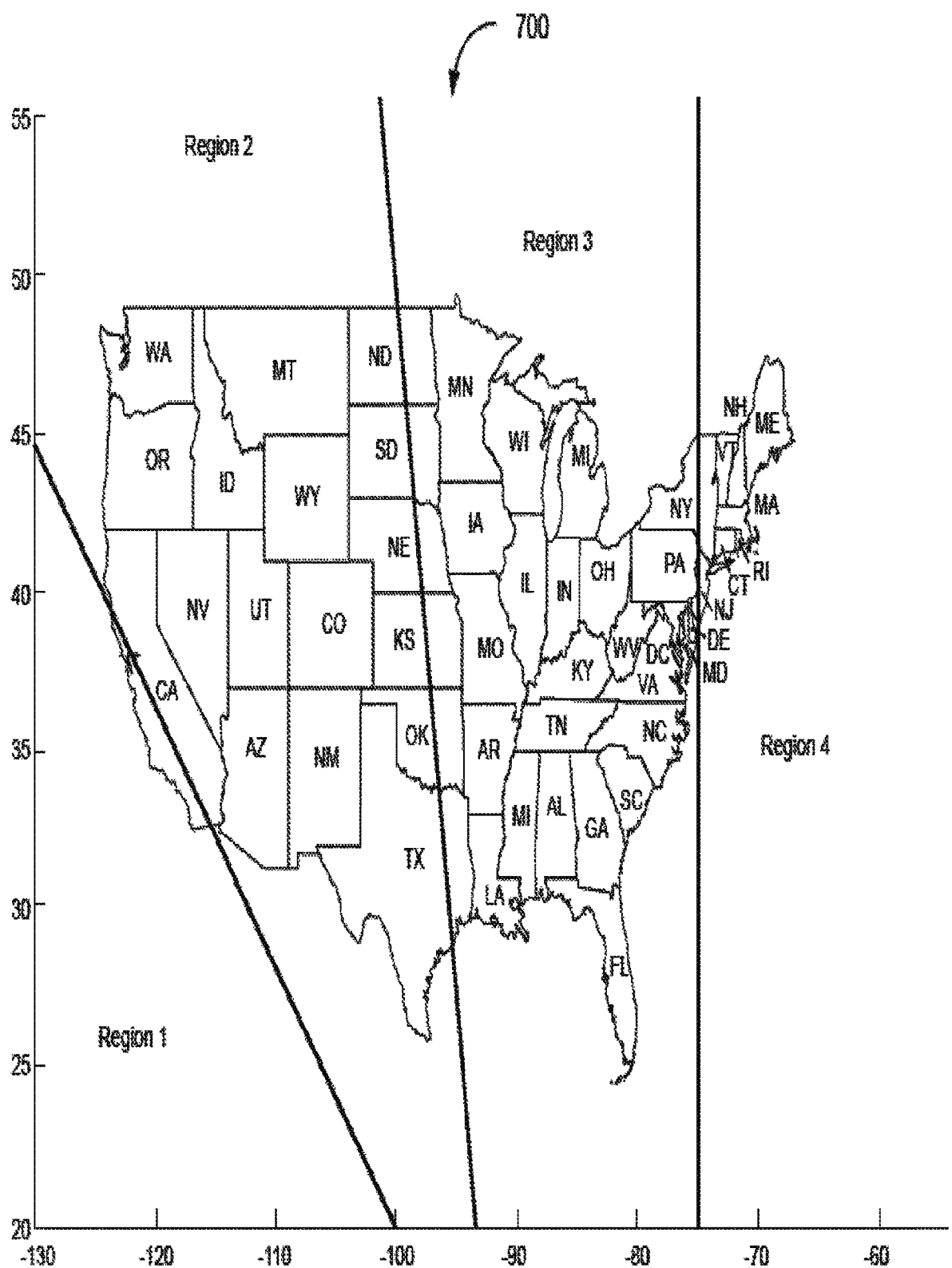
FIG. 7 illustrates an exemplary map that divides the US into regions which have similar populations.

FIG. 7 illustrates an exemplary map 700 the US has been divided into regions which have similar populations. The US map is divided into 4 regions based on revenues. Region 1 includes the southwest portion of California (e.g., Los Angeles) and indicates areas: with high population. Region 2 and Region 3 include the western and central portion of the US and indicate areas with low population. Region 4 includes the northeastern portion of the US and indicates areas with very high population.

Referring back to FIG. 2, processing logic may extrapolate national estimates using behaviorally similar areas, the extrapolation is a combination of these areas and may be calculated using the following equations where $C_L$ are the conversion estimates in the local area, and $C_N$ the conversions in the national area.

$$C_N = \sum_L \left[ \left( \frac{TVHH_L}{\sum_L TVHH_L} \right) \left( \frac{TVHH_N}{TVHH_L} \right) C_L^F \right]$$

In one embodiment, y may a univariate variable (e.g., y may be revenue which represents a metric that may be important to a business) and the national estimate may be extrapolated using the following equation where $c_L$ is a centroid estimated by a geographic clustering algorithm, and $x_i$ is the local area's geographic vector;

$$C_N = \sum_L \left[ \left( y_L / \sum_L y_L \right) \left( \frac{TVHH_N}{TVHH_L} \right) C_L^F \right] \text{ where}$$

$$y_L = \frac{1}{\#I} \sum_{i \in I} y_i : I = \{i\} \min |c_L - x_i|$$

Control Group Selection

At block 230 of method 200, processing logic selects control groups. One or more control groups may be selected for and be paired with a particular treatment group. The control groups may be selected using a combination of criteria. A first criterion may be demographic similarity. Control groups may be selected if they have similar demographics to their counterpart treatment groups. In order to match the demographics of treatment groups, a paired t-test may be performed on the array of demographic readings for treatment groups and control groups.

Table 2 illustrates exemplary control groups which are selected based on age, ethnicity and income levels of people in the areas selected for the control groups. Each row represents a control group and columns 2 through 8 indicate the percentage of difference between the control group and a corresponding treatment group. For example, Let's say that Eureka, California (Eureka CA) is being considered as a possible treatment area. Eureka CA has a 1.47% difference in the number of males over the age of 15, as compared to the US Population.

TABLE 2

| DMA2 | Urban Pct Diff | White Pct Diff | Male Pct Diff | Male 15+ Pct Diff | English Pct Diff | Under 35K Pct Diff | Over 100K Pct Diff | Avg Diff | Avg Diff Rank |
|---|---|---|---|---|---|---|---|---|---|
| EUREKA, CA | 0.0510 | 0.0083 | 0.0080 | 0.0147 | 0.0597 | 0.0080 | 0.0067 | 0.0224 | 1 |
| GREAT FALLS, MT | 0.0646 | 0.0112 | 0.0014 | 0.0096 | 0.0864 | 0.0045 | 0.0054 | 0.0262 | 2 |
| LAKE CHARLES, LA | 0.0146 | 0.0686 | 0.0005 | 0.0101 | 0.0236 | 0.0503 | 0.0168 | 0.0264 | 3 |
| CHICO-REDDING, CA | 0.0529 | 0.0247 | 0.0064 | 0.0090 | 0.0490 | 0.0292 | 0.0138 | 0.0264 | 4 |
| GAINESVILLE, FL | 0.0469 | 0.0613 | 0.0065 | 0.0100 | 0.0346 | 0.0022 | 0.0252 | 0.0267 | 5 |
| WICHITA FLS, TX | 0.0827 | 0.0482 | 0.0047 | 0.0003 | 0.0413 | 0.0238 | 0.0010 | 0.0289 | 6 |
| AMARILLO, TX | 0.0719 | 0.0463 | 0.0000 | 0.0126 | 0.0420 | 0.0365 | 0.0095 | 0.0313 | 7 |
| SPOKANE, WA | 0.0008 | 0.0720 | 0.0003 | 0.0041 | 0.0752 | 0.0624 | 0.0122 | 0.0324 | 8 |
| MEDFORD, OR | 0.0088 | 0.0793 | 0.0082 | 0.0052 | 0.0818 | 0.0375 | 0.0128 | 0.0334 | 9 |
| TOPEKA, KS | 0.0283 | 0.0363 | 0:0014 | 0.0029 | 0.0838 | 0.0916 | 0.0128 | 0.0367 | 10 |

A second criterion used to select control groups may be spatial proximity to treatment groups and/or to other control groups. The control groups should preferably be geographically close to the treatment groups. For example, the control groups would preferably be neighboring DMAs or zones. This may help ensure that the treatment groups and control groups have similar climactic factors (temperature, precipitation), economic characteristics, population attributes, etc. Spatial proximity may minimize the influence of geographic differences between paired treatment groups and control groups, and may help to improve the quality of lift measurements. Spatial proximity can be measured as the Earth surface kilometer distance between each location. The Great Circle method may be used for calculating distance (in kilometers) based on latitude-longitude (lat-lon) coordinates using the following equation:

Distinkm(x1,x2)=a cos(sin(x1.lat)*sin(x2.lat)+cos (x1.lat)*cos(x2.lat)*(cos(x2.lon−x1.lon)))*r where x1 and x2 are the geographic area locations in latitude-longitude and converted to radians (e.g., xi.lat=xi.lat/(180/pi); xi.lon=xi.lon/(180/pi)) and r is the radius of the Earth in kilometers (e.g., r=6378).

A third criterion used to select control groups may be matched movement in sales. The treatment groups and control groups may both show correlated sales for a period prior to the start of an experiment. For example, if the treatment group has high sales, the control group should also have high sales, and vice versa. Correlated movement (e.g., controlling by systematic variation) may suggest that the two areas are responding in exactly the same way to changes in environmental conditions, promotions, and other events that can affect sales. The correlated movement may be obtained using the following equations:

$$R(C_L C_{CON}) = \frac{\sum (C_{d,L} - E[C_L(pre)])(C_{d,CON} - E[C_{CON}(pre)])}{\sqrt{\sum (C_{d,L} - E[C_L(pre)])^2 \sum (C_{d,CON} - E[C_{CON}(pre)])^2}}$$

$$t(C_L, C_{CON}) = R(C_L, C_{CON}) \sqrt{\frac{(N-2)}{1 - R(C_L, C_{CON})^2}} \; ; DOF = N - 2$$

Generally, for each treatment group, processing logic will select multiple control groups (e.g., 10 control groups for comparison). Using more control groups than treatment groups may increase the statistical accuracy of tests, and may also eliminate unique factors associated with particular control groups.

Other criteria used to select control groups may include similar stores per capita (e.g., the control group may have (a) a similar number of stores per capita and (b) a similar mean distance to store, when compared to the treatment group) and the inventory in stock in the groups. The stores in the control groups should have inventory in stock. One of the problems with inventory is that some of the stores may have inventory in stock, but others may not. Validation that stores have products in-stock may be measured from inventory records, or may be approximated by determining whether the control stores have sold the product.

In one embodiment, the above factors may be incorporated into a goodness value (e.g., a control score). Areas with the highest goodness values (e.g., the top 10 areas) for each treatment group may be selected to be an aggregate control group. An area may be selected as a control group for multiple treatment groups if the area is appropriate for the each of those treatment groups. The goodness values for each control area may be obtained using the following equations:

ControlQuality(Expi,Conj)=w1*Rrank(Expi,Conj)+
w2*Distinkm(Expi,Conj)+w3*DemoSimilarity
(Expi,Conj)

After obtaining the goodness value (e.g., the control score) for each control area, the areas with the top goodness values (e.g., the areas with the top 10 good values) may be selected as the control groups.

Table 3 illustrates sample control areas for Eureka, California, and sample values use to calculate the goodness scores for the sample control areas (e.g., distance).

TABLE 3

| geoarea1 | geoarea2 | avgdiff | census rank | greatcircledistance | dist rank | overall rank |
|---|---|---|---|---|---|---|
| EUREKA, CA | CHICO-REDDING, CA | 0.01 | 1 | 109.00 | 1 | 0.5 |
| EUREKA, CA | MEDFORD, OR | 0.03 | 10 | 126.67 | 2 | 2.6 |
| EUREKA, CA | EUGENE, OR | 0.03 | 12 | 205.49 | 3 | 3.3 |
| EUREKA, CA | SPOKANE, WA | 0.03 | 8 | 564.33 | 17 | 6.7 |
| EUREKA, CA | CASPER, WY | 0.03 | 5 | 856.44 | 32 | 10.6 |
| EUREKA, CA | GREAT FALLS, MT | 0.03 | 7 | 840.89 | 31 | 10.7 |
| EUREKA, CA | GRAND JUNCTION, CO | 0.04 | 22 | 828.84 | 30 | 13.4 |
| EUREKA, CA | CHEYENNE, WY | 0.03 | 15 | 1023.36 | 36 | 13.8 |
| EUREKA, CA | IDAHO FALLS, ID | 0.04 | 39 | 628.72 | 20 | 13.8 |
| EUREKA, CA | BOISE, ID | 0.05 | 53 | 436.93 | 11 | 13.9 |
| EUREKA, CA | GAINESVILLE, FL | 0.03 | 13 | 1031.24 | 38 | 14 |

At block 235, processing logic may select a pre-period. The pre-period may be a period of activity in time that occurs before an experimental advertisement campaign is applied to a treatment group. The sales during the pre-period may be representative of "typical" sales activity. The pre-period may be in units of days, or in other units. The pre-period can be set manually by the user, or can be set automatically by processing logic.

Measuring Targetedness of Local and National Advertising

Our objective is to understand how targeting and ad weight relate to conversions. Targeting is challenging on TV because ads are not routed to individuals. Instead, ads are placed on specific programs, rotations, times, of day, etc. Targetedness can be defined in several ways. In one embodiment, degree of targetedness, is the percentage of viewers who are like the converting customer. The degree of targetedness is equal to "probability of buyer". Accordingly, the higher a targetedness rating for a viewer, the greater the probability that the viewer will convert. We provide two targetedness metrics: (a) Direct Targeting and (b) Demographic Targeting.

Direct Targeting looks at what known buyers (converters) of the product are watching, and then creates a probability for each media instance. The method calculates the probability of buyer given the TV programming mix that the individual who is being scored is watching. In other words, the analytics engine reviews all programs viewed, sums up the buyers in that pool and divides by the number of viewers, as follows:

$$r(i, \alpha, \tau) = \frac{\sum_{m:v(i,m)} \sum_{j \neq i} 1:c(j) \wedge v(j, m)}{\sum_{m:v(i,m)} \sum_{k \neq i} 1:v(k, m)} \text{ where}$$

$$t(m) \leq \tau \wedge t(m) \geq \tau - d/2$$

where i is an individual set-top box viewer who is being scored, m is one of the media instances which viewer i has watched, B(m) is the number of buyers viewing media program m, and V(m) is the universe of all viewers of media m. For example, if there were 10 buyers out of 100 on Program A, and 1 out of 100 on Program B, and an individual viewed only Program A and B, then their buyer probability is 5.5%.

Direct buyer probability calculation can run into difficulty when there are few conversions. Another method is to use the demographics of media to calculate the probability of a conversion from this media. Using this method, analytics engine 274 decomposes each individual set-top box viewer into a multiple element demographic variable-value vector I, which in one embodiment is a 400 element vector. Analytics engine 274 then compares the viewer demographics to the demographics of purchasers of the advertiser's product P. This method has the advantage that it will work across all possible TV programs, regardless of the potential sparsity of buyers in the population. Demographic targeting can be computed according to the following equation:

$$r(i, \alpha, \tau) = \frac{P \cdot I}{\|P\| \cdot \|I\|}$$

Mirroring of Local Advertising to National Advertising

Now that we can calculate the degree-of-targetedness of local and national advertising, we can now calculate the targetedness of available national and local ad inventory. We can then select local advertising inventory so that the overall targetedness (e.g., tratio) of the local advertising is similar to national tratio.

Application of Advertising Weight

At block 240, processing logic applies the experimental advertising campaign to media at the calculated advertising weight (obtained at block 220) and targeting settings. The advertisements may be applied to the media by purchasing the media from different TV stations, cable operators, satellite operators, etc. The media may be purchased manually (e.g., by calling a TV station and purchasing air time directly). The media may also be purchased from a publisher inventory listing. For example, Wide Orbit presently lists some inventory that is available to buy, and allows companies to login and purchase the media from their automated system via a machine application programming interface (API). Media may also automatically be purchased (e.g., without user input) by declaring the intent to purchase inventory and then posting the offer to be fulfilled. For example, a buy order (e.g., stations, days, desired price, etc.) may be created, and posted at a location (e.g., posted on an online server or email to an operator. Processing logic may wait for the buy order to be fulfilled by operators (e.g., cable operators, TV stations, etc.). The buy order may include a "good through" date, where the buy order expires after the good through date.

At block 245, processing logic obtains sales results in the treatment groups and control groups, and calculates the statistical significance of the effects (e.g., the results or sales) of the experimental advertising campaign. Calculating the statistical significance may allow processing logic to verify that a statistically significant change in the treatment group can be detected (e.g., the change is high enough to be detectable). Statistical significance can be calculated at multiple levels: (1) Individual local area per week, (2) Individual local area over multiple weeks, (3) All local areas together per week, (4) All local areas together over multiple weeks, etc. The statistical significance may be calculated using a variety of tests including the t-test, Wilcoxon rank sum test, etc. The change in sales for an area (e.g., the movement) may be statistically significant if the p-value (e.g., the probability that change in sales occurred by change) is below a certain threshold (e.g., 0.05 or 0.1).

Measurement of Sales Effects in Treatment Area

Table 4 illustrates exemplary changes in a treatment group after the experimental advertising campaign is run in the treatment groups. As shown in Table 4, the treatment group experienced a 78% lift (e.g., a 78% increase in sales) as a result of the experimental ad campaign. This change (e.g., the 78% lift) is statistically significant (e.g., p<0.03).

TABLE 4

| Metric | ExpLift vs. Paired controlLift pre-exp | ExpLift vs. PairedLift during exp |
| --- | --- | --- |
| mean diff (%) | 0% | 78% |
| meanbaseline | 1 | 0.909126 |
| meanexp | 1 | 1.620094 |
| stdbaseline | 0.447353 | 0.464427 |
| stdexp | 0.75633 | 1.102215 |
| diff in means | 0 | 0.710968 |
| stderrs | 0.251331 | 0.343671 |
| Dof | 23 | 23 |
| ttest | 0.500 | 0.025 |

Table 5 illustrates more exemplary changes in multiple treatment groups (e.g., Ft. Meyers, Monterey, Palm Springs, San Diego, etc.) after the experimental ad campaign is run. As shown in Table 5, each treatment group showed movement that was statistically significant.

TABLE 5

| metric | FT. MYERS-NAPLES2 | MONTEREY-SALINAS | PALM SPRINGS | SAN DIEGO | SANTA BARBRA-SAN MAR-SAN LUOB | WEST PALM BEACH-FT. PIERCE | Control |
| --- | --- | --- | --- | --- | --- | --- | --- |
| mean diff (%) | 129% | −31% | 358% | 201% | 114% | 7% | 6% |
| meanbaseline | 0.09090909 | 0.04545454 | 0.01136363 | 0.07954545 | 0.03409090 | 0.34090909 | 16.2272717 |
| meanexp | 0.20833333 | 0.03125 | 0.05208333 | 0.23958333 | 0.07291666 | 0.36458333 | 17.21875 |
| stdbaseline | 0.39058940 | 0.29977351 | 0.10660035 | 0.31152538 | 0.18250263 | 0.82888047 | 10.6163258 |
| stdexp | 0.57886761 | 0.22725478 | 0.30330778 | 0.47561133 | 0.29893817 | 0.65082606 | 10.0401332 |
| diff in means | 0.11742424 | 0.01420454 | 0.04071969 | 0.16003787 | 0.03882575 | 0.02367424 | 0.99147727 |
| stderrs | 0.07347062 | 0.03902253 | 0.03412030 | 0.05985076 | 0.03691533 | 0.10940142 | 1.52297929 |
| dof | 182 | 182 | 182 | 182 | 182 | 182 | 182 |
| ttest | 0.05586127 | 0.35813698 | 0.11713005 | 0.00408928 | 0.14715403 | 0.4144599 | 0.25793002 |

At this point, a series of local areas (treatment groups), each of which has received some amount of impressions, and which has been observed to have lifted a certain amount, have been identified. Control groups have also been identified to help to control for a variety of factors. The results from these treatment groups and control groups may be used to construct a "media mix model" which can predict the expected number of conversions that would be generated nationally, for any amount of impressions. The impact of local impressions (e.g., a local treatment) applied to treatment groups may be calculated using the difference of differences (DD) function. The DD function may use the following equation:

$$C_{exp,L} = (\text{Exp}(2) - \text{Exp}(1)) - (\text{Con}(2) - \text{Con}(1))$$

However, the general DD function may have certain limitations. When estimating conversions experimentally, the local treatment groups may be small, and may have different sizes when compared to the control groups, and to the ultimate target area to which the advertisement campaign will eventually be injected (e.g., the national level or area). For example, the control groups might average 10 conversions per week and grew by 1 conversion per week. The treatment group might average only 1 conversion per week and grew by 0.1 conversions. Using the standard DD function, the treatment group would be assumed to undergo a 1 conversion upward movement (the same as control group), and so it would appear that the treatment group actually shifted downwards by −0.9 conversions per week. In actuality, the treatment group grew at about the same rate as the control group (e.g., at around +10% for both). As a result, model construction should be performed in a way that is scale invariant. The inherent "conversion generating capacity" of each area/group should be factored into the model because it is likely that the areas/groups will not have the same size. Accordingly, in some embodiments other methods may be used to calculate the impact of local impressions applied to treatment groups.

One technique that may be used to calculate the impact of local impressions is the DD per capita method. Several units may be used by the DD per capita method, including conversions per capita, conversions per TV household (TVHH), conversions per retail store, and even conversions per square kilometer. Of these, conversions per TV Household may be easier to use for TV advertising because each TV household is a potential generator of conversions. The conversions units may be normalized so that they are expressed in terms of conversions per TVHH. This may be scaled to any experimental area of interest by multiplying the estimate for the area by the number of TVHHs in the area.

In one embodiment, the DD per capita method calculates lift as an increase in per capita conversions per period. The DD per capita method may calculate the change in conversions per capita in control groups. This change is subtracted from any movement in conversions per capita in treatment groups. The remainder of conversions per capita in treatment groups are the conversions per capita that occurred in a treatment group that could not be accounted for by changes in the control groups. After calculating the new conversions per capita in treatment groups due to the experimental ad campaign, an extrapolation of conversions is then made to the national ad campaign by multiplying by the national TVHHs. The DD per capita method may use the following equations:

$$\Delta q_N(t_1, t_2) = \Delta Q_N(t_1, t_2) \cdot TVHH_N \quad (1)$$

$$\Delta Q_N(t_1, t_2) = \frac{1}{J} \sum_{j=1}^{J} [s(d_j) \cdot \Delta Q_L(d_j, t_1, t_2)] \quad (2)$$

-continued $$\Delta Q_L(d_j, t_1, t_2) = [Q(d_j, t_2) - Q(d_j, t_1)] - \left[\frac{1}{I}\sum_{i=1}^{I}[Q(D_i(d_j), t_2) - Q(D_i(d_j), t_1)]\right] \quad (3)$$

$$Q(d, t) = q(d, t)/TVHH_d \quad (4)$$

where $Q(d,t)=q(d,t)/TVHH_d$=conversions per capita in treatment group d during time-period t, where q(d,t) is the quantity of conversions generated in treatment group d in time-period t appropriately normalized to a quantity per unit of time (e.g., a day), where $d_j$ is the jth local treatment group selected so as to be matched to national, where $D_i(d)$ is the ith local control group matched to d, where $t_2$ is a time-period during the experimental ad campaign, and where $t_1$ is prior to the experimental ad campaign. Each of the time-periods represents a certain amount of time during which measurement is taken. For example, $t_1$ might span two months prior to the experiment start, and $t_2$ might be the first week of the experimental ad campaign. Quantities have may be normalized to equivalent units so that different lengths of time do not increase the quantities. $TVHH_d$ are the number of TV Households in treatment group d. $TVHH_N$=112,000,000 are the number of TV Households nationally.

The above formulas may be modified to provide different estimates for national conversions. For example, instead of using the mean in equation (2), the media may be used. Similarly, instead of using the mean in equation (3), the media may be used. The DD per capita method above uses the average per capita change observed in multiple areas, and implicitly gives equal weight to each treatment group. However some areas could be large and others could be small. Rather than averaging treatment group per capita increases as is done in equation (2) the treatment group conversions may be summed first and then divided by sum of TV Households. This may have the effect of causing larger TVHH areas to exert more influence on the estimate of per capita increase.

A second method to calculate the impact of local impressions is a difference in lifts method. The difference in lifts method may normalize both treatment and control group conversions so that each conversion reading is in units of the group's own average pre-experiment conversions per week average. There may be some difference in the behavior and/or means of different groups, and these inherent differences are all being "normalized out" so that the group is only being measured against its own performance during a pre-experimental period. The difference in lifts method may also make predictions for any experimental area or group of interest. The estimate of percent change may be converted into conversions by multiplying with the pre-experiment period average to predict actual conversions in the area or group of interest. The difference in lifts method may look for an increase in conversions, as compared to the typical conversion-generating performance of each group. The difference in lifts method may use historical data to calculate typical or baseline performance, and then may look for changes compared to that historical baseline. Control group increases (or decreases) are first calculated, and then the increase or decrease for the treatment groups are calculated. The excess treatment group percentage change compared to control group may be due to the intervention and is then equal to the lift due to experimental ad campaign. The number of national conversions that, when multiplied by the lift, reach the actual number observed are the national conversions not due to the ad campaign. The excess that when added reach observed national conversions are due to the ad campaign. The difference in lifts method may use the following equations:

$$\Delta q_N(t_1, t_2) = q_N(t_2) - \frac{q_N(t_2)}{1 + \% \, q_N(t_1, t_2)}$$

$$\% \, q_N(t_1, t_2) = \frac{1}{J}\sum_{j=1}^{J}[s(d_j) \cdot \% \, q_L(d_j, t_1, t_2)]$$

$$\% \, q_L(d_j, t_1, t_2) = [q(d_j, t_2)/q(d_j, t_1)] - \left[\frac{1}{I}\sum_{i=1}^{I}[q(D_i(d_j), t_2)/q(D_i(d_j), t_1)]\right]$$

A third method to calculate the impact of local impressions is the conversions per capita method. If there are no background or organic conversions, then there is no background control movement to compare against and remove. This may be the case when advertisers are running TV, toll free numbers, or otherwise have little brand name recognition in an area. In this case, the effect from TV can be directly measured by the number of conversions per capita observed in a particular group or area using the following equations:

$$\Delta q_N(t_1, t_2) = \Delta Q_L(t_1, t_2) \cdot TVHH_N$$

$$\Delta Q_L(d_j, t_1, t_2) = \frac{Q(d_j, t_2)}{TVHH_L}$$

Automatic Adjustment to Impressions to Achieve Statistically Measurable Lift

At block 250, processing logic may adjust the media concentration (e.g., the amount of TV advertisements, also known as the advertising weight) in areas where the change in sales does not meet a threshold for statistical significance (e.g., p>0.05). Processing logic may adjust the media concentration using the following formulas:

$$I(d,t)=I(d,t)*\alpha$$

$$I(d,t)=I(d,t)+\epsilon$$

where I(d, t) is the advertising weight (e.g., the impression concentration) in a location "d" at a time "t." If the threshold for statistical significance is met, then processing logic may automatically decrease the concentration applied to the areas that meet the threshold for statistical significance using the following formulas:

$$I(d,t)=I(d,t)/\alpha$$

$$I(d,t)=I(d,t)-\epsilon$$

At block 260, processing logic may generate or update a model mapping advertising weight and degree of targetedness to sales metrics for the national ad campaign and/or for the experimental ad campaign.

At block 265, processing logic extrapolates measured lift in a treatment group over the control group to the national ad campaign. As discussed earlier, there may be an existing national advertising campaign currently running. Processing logic may calculate the amount of lift that is due to the existing national advertising campaign in order to determine the lift in a treatment group that is due to the experimental ad campaign.

At block 270 processing logic may optimize targeting based on current performance.

Automatic Optimization of National Campaign Constraints Based on Sales Performance One method of optimizing targeting uses tcpm to adjust to the empirical overshoot or undershoot to converge on the correct tcpm to achieve the desired CPA goal. The tcpm may be a measure of the cost per targeted impression and may be defined as follows:

tcpm(m,p)=cpm(m)/tratio(m,p)

The following equations may be used to optimize targeting using tcpm:

If CPAdesired<CPAactual then
tcpmtarget=tcpmactual*(CPAdesired/CPAactual)

If CPAdesired>CPA then tcpmtarget=tcpmactual*
(CPAactual/CPAdesired)

A second method for optimizing targeting may increase or decrease tratio (targetedness) in order to converge to the goal.

If CPAdesired<CPAactual then
tratiotarget=tratioactual/(CPAdesired/CPAactual)

If CPAdesired>CPA then tratiotarget=tratioactual/
(CPAactual/CPAdesired)

Optimization of Advertising Plan

Media is then selected according to the Greedy Algorithm below, where tratiotarget and tepmtarget are constraints which are set using the above algorithm, which is dependent upon current performance. Our objective is to select a set of TV media into which to insert an ad, such that advertiser value per dollar is maximized. Let $M_i$ be a contiguous segment of time in the TV MPEG video stream that a station is offering for sale, $CPM(M_i)$ be the cost per thousand impressions of the timeslot, $r(M_i)$ be the degree of targetedness and $I(M_i)$ be the impressions for the timeslot. The objective is to select a set of Media which maximizes:

$$\sum_i r(M_i) \cdot I(M_i) \text{ subject to}$$

$$\sum_i CPM(M_i) \cdot I(M_i)/1000 \le B;$$

$$V(\{M_i\}) = \text{true};$$

$$\frac{\sum_i CPM(M_i) \cdot I(M_i)/1000}{\sum_i r(M_i) \cdot I(M_i)} \le tcpmtarget;$$

$$\frac{\sum_i r(M_i) \cdot I(M_i)}{\sum_i I(M_i)} \le tratiotarget$$

Where B is the television campaign budget, V determines if the set of media violates rotation rules (such as running an ad more than once per 60 minutes, having greater than 5% of budget on any one network or day-part, and so on). Rotation rules are defined by television ad buyers.

A greedy strategy for allocating television media is to select media in order of value per dollar, as follows:

$$M_i : \max \frac{r(M_i)}{CPM(M_i)}$$

This may be subject to the rotation rule constraints until the budget is filled.

The operations of blocks 270 and 275 may be performed together to fine tune a national advertisement campaign in order to achieve a user's goals. Techniques for optimizing an advertising campaign are discussed in greater detail below with reference to FIGS. 17-18.

Referring back to FIG. 2, at block 280, and as described in the Greedy Algorithm above, processing logic may select media that is at or lower than the desired tcpm and purchases the media (e.g., purchases the media from a cable or satellite operator). Processing logic may additionally select media that corresponds to the determined degree of targetedness and advertising weight. Advertisements from the national advertisement campaign may then be shown on the purchased media.

At block 285, the media characteristics of the experimental or local advertisement campaign is updated to match the national media characteristics, which was updated in blocks 270-280. This may include selecting media for the local advertisement campaign in the treatment groups so that the tratio and tcpm in the treatment groups matches that for the national ad campaign. This may help to ensure that local performance is representative of national performance.

At block 290, the processing logic determines whether the national ad campaign has ended. If the ad campaign is ended, the method ends. If the ad campaign is ongoing, then the method may return to block 240, and additional operations may be performed to continue to track the ad campaign in real time. Various analyses, measurements, models, and reports may be generated using the above formulas, data, metrics, lifts, and other information described above. These analyses and reports may be useful in changing or optimizing a media campaign.

Mirrored Tracking

Figure 8A:
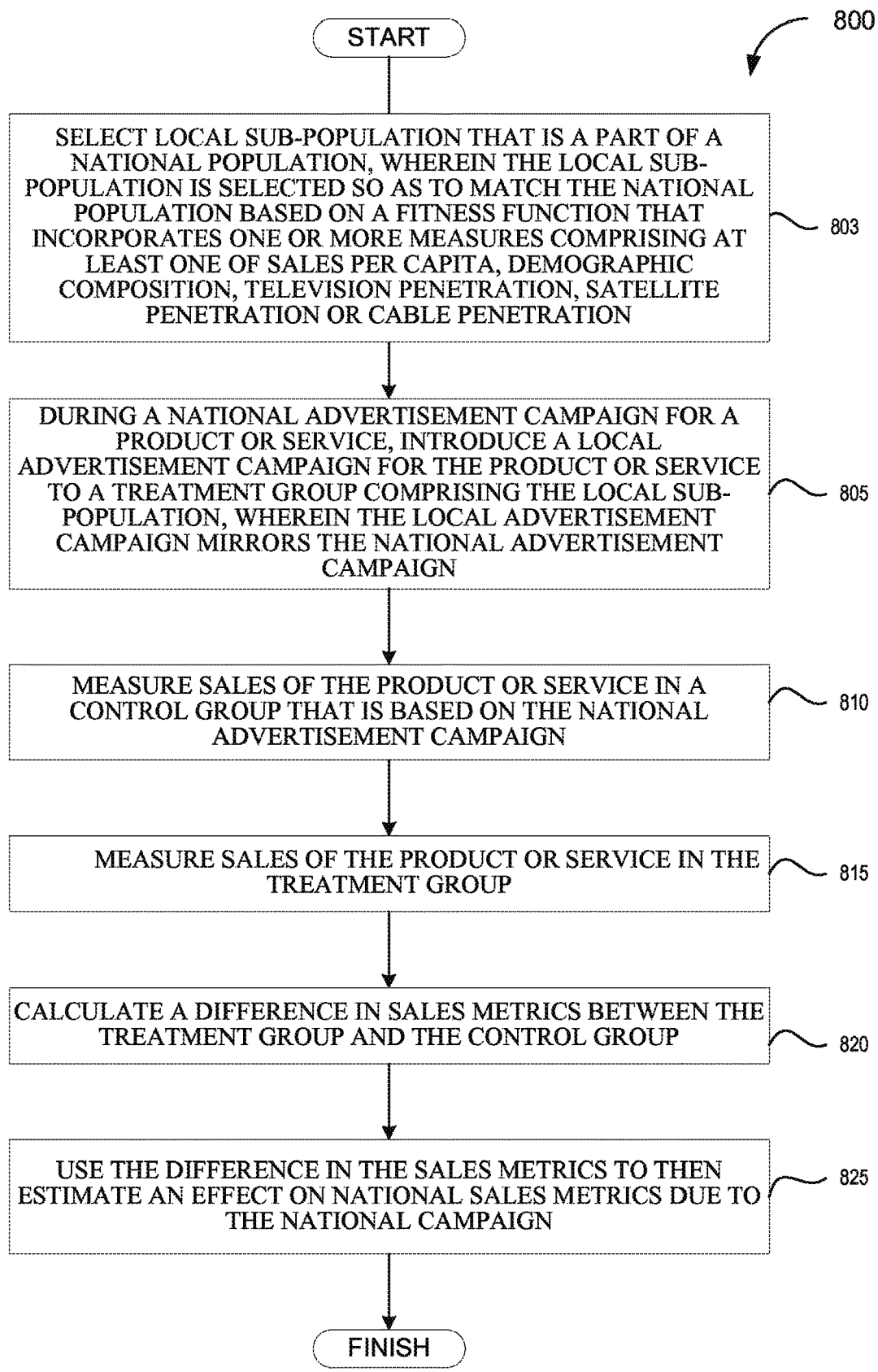
FIG. 8A is a flow diagram illustrating a method for real time tracking of an advertisement campaign, according to one embodiment.

We will now describe in more detail an embodiment of the method that is designed to track national campaign lift using local tracking areas. FIG. 8A is a flow diagram illustrating a method 800 for real time tracking of an advertisement campaign, according to another embodiment. The method 800 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to track and manage an advertisement campaign. In one embodiment, method 800 may be performed by a processor, as shown in FIG. 19.

During a national television ad campaign, which is injecting $I_N(N)$ impressions into all national areas, it may be desirable to measure its multi-channel effects $Q(N)$. In one embodiment, local ad insertion is performed to add additional impressions $I_L(d)$ to some treatment groups (e.g., local areas) d. In one embodiment, additional impressions are added carefully to maintain homogeneity between national and local ad viewers. Such a process is referred to herein as "mirroring," and involves careful matching of treatment groups to national viewership. Such a method may be performed using existing TV capabilities in order to create mirrored treatment groups. Alternatively, treatment groups may not be mirrored, and may be applied to a multi-dimensional model that adjusts for differences between the treatment group and the national viewership.

For national ad insertion, advertisements can be inserted into a national video stream by electronically or manually trafficking the ads and rotation logic to one or more Networks (e.g., ABC, CBS, Fox, NBS, CW, etc.) or cable stations (e.g., CNN, SciFi, HBO, etc.) directly. TV ads can be purchased for programs, rotations, run of station, and so forth.

For local Cable station ad insertions, the Cable MSO itself inserts the ad into the video stream, and has 2 minutes per hour of possible ads to insert, so approximately 13% of ad inventory. The MSO has multiple levels of signal control. This includes the Cable Interconnect $f$, which cover Direct Marketing Association (DMA) areas or zones. Each zone may be a collection of about 10,000 households.

For local Broadcast station ad insertion, local ad insertion is handled by the local station (e.g., KOMO). 4 minutes per hour of time are provided for local station IDs, as well as local ads, so about 26% of ad inventory is available to be purchased locally. There are approximately 2,000 cable zone areas that can be purchased, and over 2,500 local broadcast stations, providing considerable ability to create representative treatment mirrors.

Figure 9A:
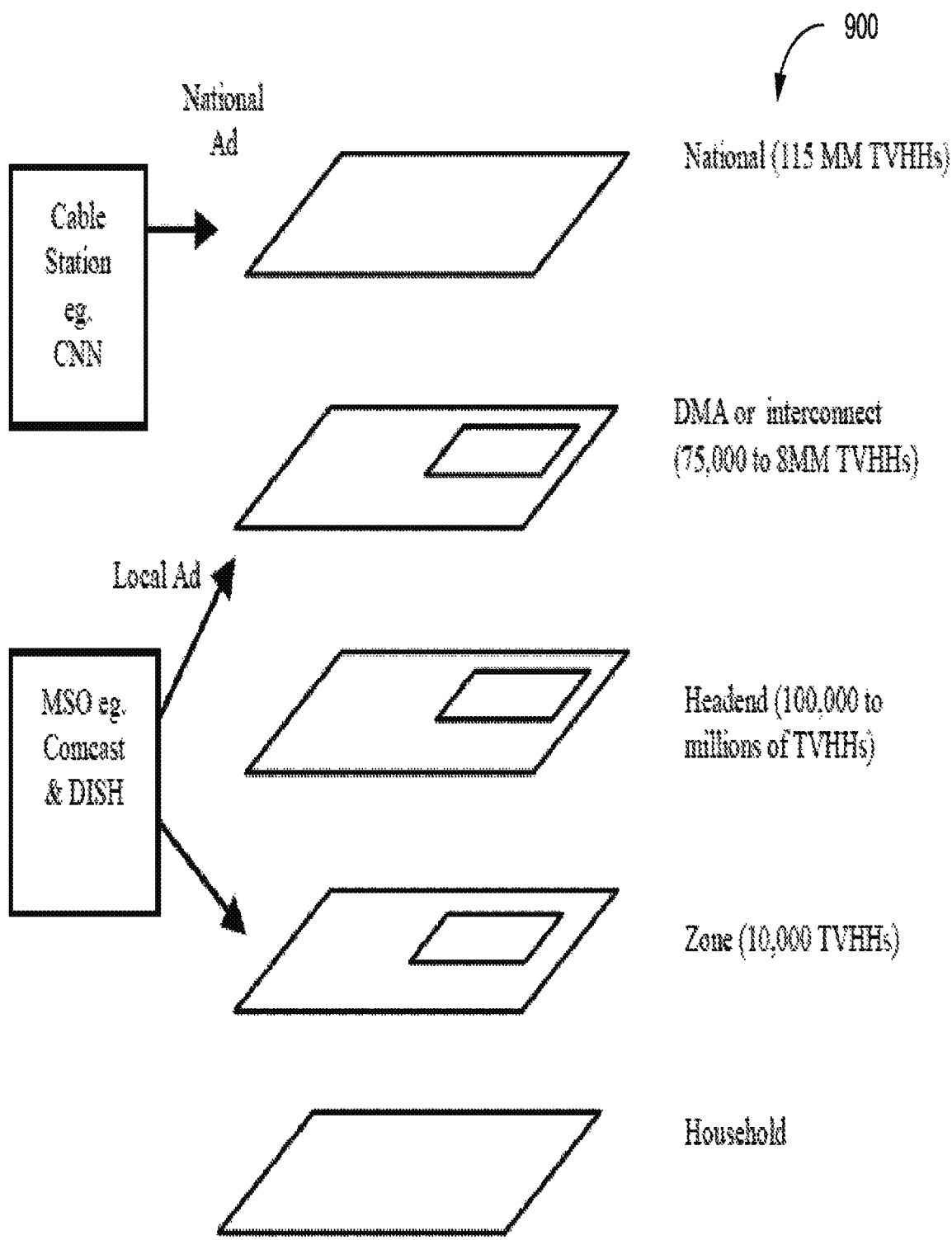
FIG. 9A illustrates local ad insertion during a national advertisement campaign, in accordance with one embodiment of the present invention.

FIG. 9A illustrates local ad insertion during a national advertisement campaign, in accordance with one embodiment of the present invention. As shown, an advertisement may be shown nationally, such as on CNN. The same advertisement may also be shown locally at a DMA or interconnect, at a head end, or at a cable zone. Therefore, viewers of the DMA, interconnect, head end or cable zone will be presented with both the national advertisement and the local advertisement.

Referring back to FIG. 8A, at block 803 of method 800 processing logic selects a local sub-population that is a part of a national population. The local sub-population is selected so as to match the national population based on a fitness function that incorporates one or more measures comprising at least one of sales per capita, demographic composition, television penetration, satellite penetration or cable penetration. At block 805, during a national advertisement campaign for a product or service processing logic introduces a local advertisement campaign for the product or service to a treatment group that includes the local sub-population. The local advertisement campaign may mirror the national advertisement campaign.

At block 810, processing logic measures sales of the product or service in a control group that is based on the national advertisement campaign. The control group may be selected using previously discussed techniques. At block 815, processing logic measures sales of the product or service in the treatment group. At block 820, processing logic calculates a difference in sales metrics between the treatment group and the control group. At block 825, processing logic uses the difference in the sales metrics to then estimate an effect on the national sales metrics due to the national campaign.

Figure 9B:
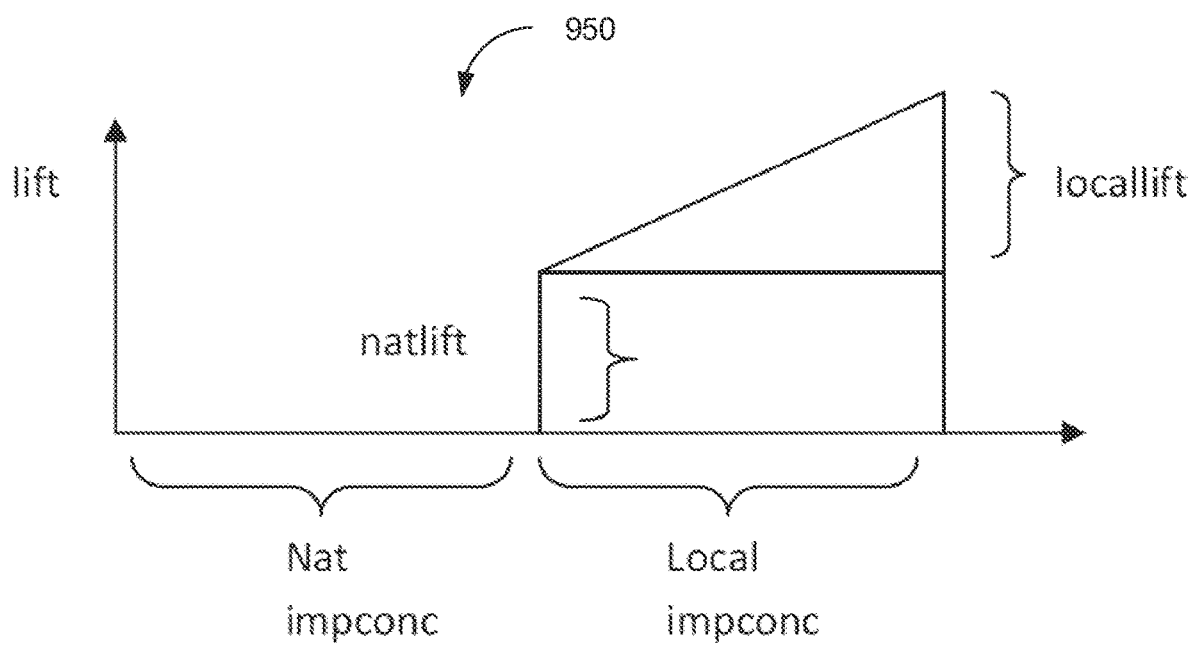
FIG. 9B is an exemplary graph that illustrates the amount of lift caused by an existing national advertising campaign and the lift caused by an experimental ad campaign in a treatment group, according to one embodiment.

FIG. 9B is an exemplary graph 900 that illustrates the amount of lift caused by an existing national advertising campaign and the lift caused by the experimental ad campaign in a local treatment area or group, according to one embodiment.

As discussed above, during a national television ad campaign, which is injecting $I_N(N)$ impressions into all national areas, it may be desirable to measure its multi-channel effects $Q(N)$. In one embodiment, local ad insertion is performed to add additional impressions $I_L(d)$ to some treatment groups (e.g., local areas) d. There are 2,000 cable and broadcast areas d available. In one embodiment, an objective for selecting good treatment groups is to find areas that match national well enough so that they allow for accurate extrapolation to national. In one embodiment, the local areas and national are preferably homogenous populations, and so ads displayed locally have the same effect as is occurring nationally.

Treatment Area Selection Criteria

Figure 8B:
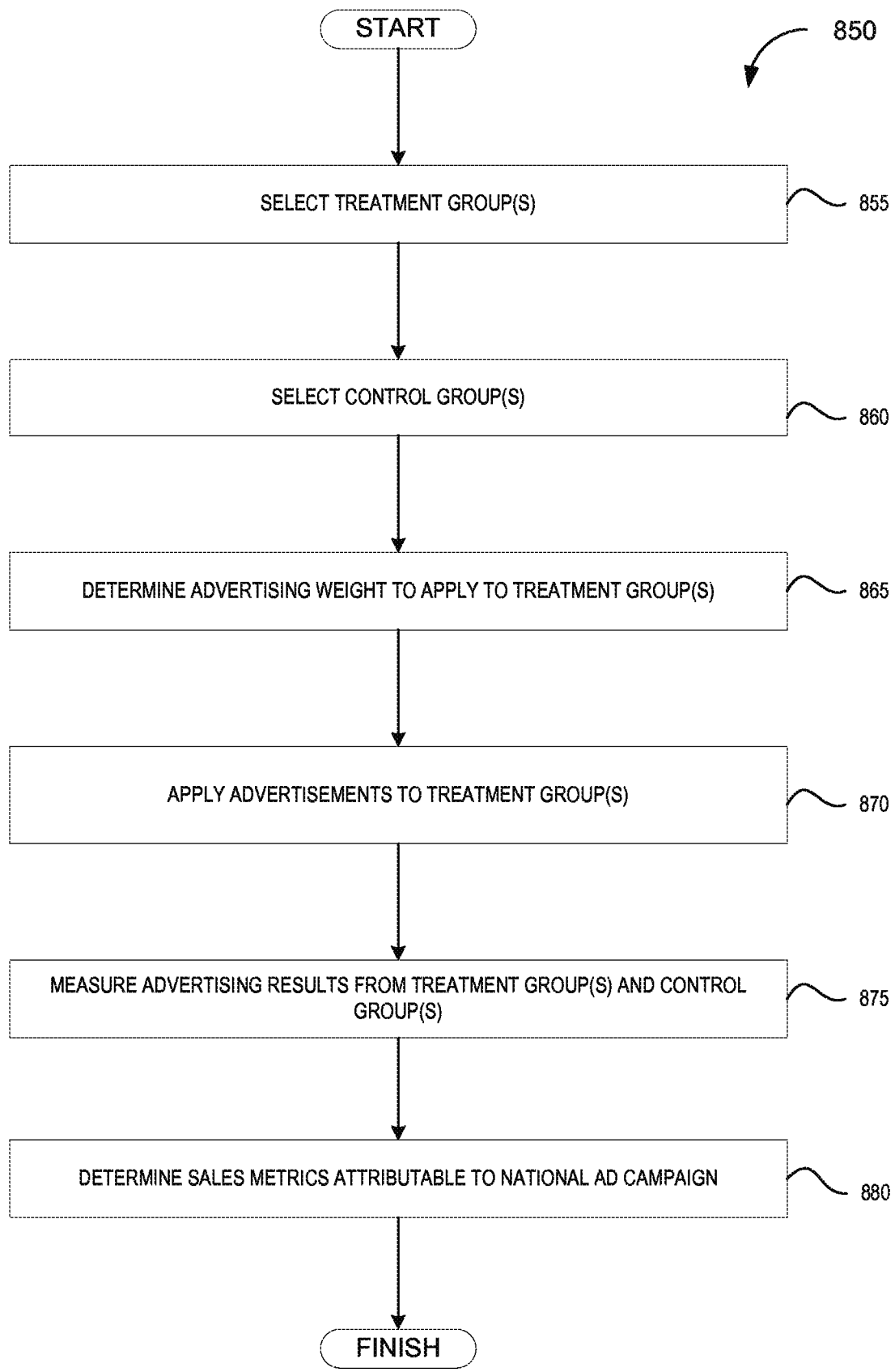
FIG. 8B is a flow diagram illustrating another method for real time tracking of an advertisement campaign, according to another embodiment.

FIG. 8B is a flow diagram illustrating a method 850 for real time tracking of an advertisement campaign, according to another embodiment. The method 850 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to track and manage an advertisement campaign. In one embodiment, method 850 may be performed by a processor, as shown in FIG. 19.

At block 855 of method 800, processing logic selects one or more treatment groups. These treatment groups may be selected using one or more selection algorithms. Some selection algorithms may incorporate previously selected treatment groups. Accordingly, in one embodiment multiple treatment groups are selected serially.

Multiple criteria may be applied for selection of treatment groups. A first criterion may be a low census disparity from a national average. The mean absolute difference between the ith US population census demographic $x_i(N)$, and the demographic reading $x_i(d)$ of a particular region d in one embodiment is preferably as low as possible. A lower value indicates that the area is not greatly different from the US average. Zip-code-level demographics are publicly available from the US Census Bureau and these can be aggregated to the same level as the cable and broadcast systems. In the formula below $w_i$ is a weight applied to each demographic.

$$m_1(d) = \sum_i w_i \cdot |x_i(d) - x_i(N)|$$

Another criterion may be average sales per capita. If a candidate treatment group has sales per capita that are higher than the national average, then it is possible that the area in question might have advertising elasticities which are also different. In order to introduce fewer assumptions or differences into the design, in one embodiment we will therefore favor areas which have sales per capita close to the national average.

$Q(d)=q(d)/TVHH(d)$=conversions per capita in area d where q(d) is the quantity of conversions generated in area d, TVHH(d) are the number of TV Households in area d, and TVHH(N)=112,000,000 are the number of TV Households nationally. The following equation may capture this criterion.

$m_2(d)=|Q(d)-Q(N)|$

Another criterion may be TV media targeting. The targeting of the media being through the local injection systems needs to match the media being purchased nationally. Targeting is measured by the demographic viewership match between media and the product demographics r(d). The following equation may capture this criterion.

The degree of targetedness can be equal to "probability of buyer". One method calculates the probability of buyer given the TV programming mix that the individual who is being scored is watching. In other words, the analytics engine reviews all programs viewed, sums up the buyers in that pool and divides by the number of viewers, as follows:

$$r(i, \alpha, \tau) = \frac{\sum_{m:v(i,m)} \sum_{j \neq i} 1:c(j) \wedge v(j, m)}{\sum_{m:v(i,m)} \sum_{k \neq i} 1:v(k, m)} \text{ where}$$

$t(m) \leq \tau \wedge t(m) \geq \tau - d/2$ where i is an individual set-top box viewer who is being scored, m is one of the media instances which viewer i has watched, B(m) is the number of buyers viewing media program m, and V(m) is the universe of all viewers of media m. For example, if there were 10 buyers out of 100 on Program A, and 1 out of 100 on Program B, and an individual viewed only Program A and B, then their buyer probability is 5.5%.

Another method is to use the demographics of media to calculate the probability of a conversion from this media. Using this method, analytics engine 274 decomposes each individual set-top box viewer into a multiple element demographic variable-value vector I, which in one embodiment is a 400 element vector. Analytics engine 274 then compares the viewer demographics to the demographics of purchasers of the advertiser's product P. This method has the advantage that it will work across all possible TV programs, regardless of the potential sparsity of buyers in the population. Demographic targeting can be computed according to the following equation:

$$r(i, \alpha, \tau) = \frac{P \cdot I}{\|P\| \cdot \|I\|}$$

Now that we can calculate the degree-of-targetedness of local and national advertising, we can now calculate the targetedness of available national and local ad inventory. We can then select local advertising inventory so that the overall targetedness (e.g., tratio) of the local advertising is similar to national tratio.

Our treatment are fitness function then includes the degree of difference in media targeting between the local treatment area and the national area where the national campaign is running. As the difference in targeted between the two areas diminishes, the treatment area and the media selected for that treatment area score better in terms of fitness.

$m_3(d)=|r(d)-r(N)|$

Another criterion may be high geographic dispersion from other treatment groups. It may be useful to avoid areas which are too close together. Multiple test cells (treatment groups) all in the same general geographic area increases the threat that some unique factor in this particular region is influencing sales and elasticities. By spreading out the test cells over a wider area, this threat can be reduced. In addition, increasing the dispersion of tracking cells also even helps avoid spillover of TV broadcasts into neighboring areas, avoiding contamination of other treatment cells. Let the set of possible geographic areas be G, and already selected areas S≤G. Processing logic may use the Great Circle method to find the closest already-selected treatment area in Earth Surface distance kilometers, and report this as dispersion from previously selected areas. In the definition below, latitude and longitude are both converted from Cartesian to radians; where $$d_{lat} = \frac{d_{lat}}{180/\pi},$$

and K=6378 is the Earth radius in kilometers. The following equations may capture this criterion.

$$m_o(d_j) = \min(\text{ESD}(d_j, e) : \forall e \in d_{1,j-1})$$

$$\text{ESD}(d,e) = a \cos[\sin(d_{lat})\sin(e_{lat}) + \cos d_{tar} \cos e_{lat} \cos e_{lon} - d_{lon}] \cdot K$$

Another criterion may be low cost. Cheaper areas allow for more media to be run for the same price. Prices of areas are available from companies which monitor the clearing price of all ad buys on TV. Smaller geographic areas tend to be less in demand and have lower prices, and so are favored for testing over areas such as New York in some embodiments. The following equations may capture this criterion.

$$m_4(d) = \text{TVVH}(d) \cdot \text{CPM}(d)/1000$$

Another criterion may be cable and satellite penetration. Some areas of the country have lower numbers of cable TVs. In some embodiments, processing logic attempts to avoid selecting areas with unusually low cable adoption rates. The following equations may capture this criterion.

$$m_5(d) = |\text{pen}(d) - \text{pen}(N)| < \text{PEN}$$

Another criterion may be number of insertable networks. Insertable networks are stations that can have ads inserted to them. If the number of insertable networks becomes too low, then local inventory may not be able to match national. The following equations may capture this criterion.

$$m_6(d) = \text{sgn}(\text{insert}(d) \geq \text{INS})$$

Treatment Area Selection Fitness Function

Using some or all of the factors described above, a weighted fitness score may be calculated for each candidate treatment group. Iterative recalculation may be performed since the GeoDispersion metric is dependent upon areas that have already been selected. In the formula below, R converts the raw number into a percentile.

$$d_j : \min\left(\sum_k M_k \cdot R(m_k(d_j)) : d_j \notin d_{1..j-1}\right)$$

Control Area Selection

At block 860, processing logic selects one or more control groups using one or a set of fitness criteria. In one embodiment, one or more control groups are selected for and paired with each treatment group. Additionally, one or more general control groups may be selected that are not paired to any treatment groups. The control groups enable processing logic to measure treatment change in quantity per capita versus control change in quantity per capita over the same period of time. In order for this comparison to show differences due to TV (and not other factors), it is preferable in some embodiments to ensure that the control group purchase behavior, demographics, and responsiveness to advertising are all as close as possible to the treatment groups. Some or all of the following criteria may be used to attempt to ensure homogeneity across multiple dimensions between the control and treatment groups.

A first criterion may be demographic similarity. Controls should preferably have similar demographics to their corresponding treatment group. The $D_j$th area to be selected has the following match difference:

$$u_1(D_j, d) = \sum_i \left| \left( \frac{1}{J} \sum_{j=1}^J x_i(D_j) \right) - x_i(d) \right|$$

A second criterion may be geographic proximity. Whereas treatment groups were ideally geographically dispersed, the control groups should preferably be geographically close to their treatment groups. This helps to ensure that treatment and control areas have the same climactic factors (temperature, precipitation), economic characteristics, population attributes, and so on. The following equation captures this criterion.

$$u_2(D_j, d) = \text{ESD}(D_j, d)$$

A third criterion may be matched movement. In one embodiment, the control and treatment groups should both show coordinated movement in sales for an extended period prior to the start of the experiment. When the treatment group has high sales, the control group should have high sales, and vice versa. Systematic variation is a strong test for relatedness since it suggests that the two areas are responding in the same way to changes in environmental conditions, promotions, and other events that can affect sales. In the definition below, the error is proportional to the absolute difference between treatment and the sum of control areas by day. The difference of differences method will also scale the error by national sales, and so we also multiply the different by national $Q(N,t)^\eta$.

$$u_3(D_j, d) = \sum_t Q(N, t)^\eta \cdot \left[ Q(d, t) - \frac{\sum_j q(D_j, t)}{\sum_j \text{TVHH}(D_j, t)} \right]^\delta$$

Control Area Selection Fitness Function

In one embodiment, unlike treatment groups, control groups do not require the purchase of any local media. Accordingly, the boundaries that may restrict the selection of treatment groups may not apply to control group selection. This is useful because it means that controls can be selected at a finer-grain than the treatments. Treatments utilized 2,000 zones, averaging about 55,000 TV households each. Controls can be built from over 30,000 zip codes, averaging just 3,800 TV Households. Accordingly, processing logic may assemble a set of control groups that match very precisely the demographics of the treatment groups.

The algorithm for selecting controls may be iterative, similar to treatment group selection. However, in one embodiment, multiple control groups are selected for each treatment group. The set of control groups may be assembled to collectively match the treatment group. In one embodiment, a best matching control group is selected. Say that this control group matches well, but has too few African Americans. When selecting the next control group that is being matched to the treatment group, the error function is the match between the total controls (all control groups selected for that treatment group), including the new candidate control group and the originally selected control group. As a result, if one candidate control group causes the African American quota to move closer to the treatment group, then this control group will be favored. As a result, the iterative procedure may self-correct by successively selecting areas which together have demographics and sales which match the treatment group. Control groups D(d) may be selected for each treatment group (d) based on the following algorithm:

$$D_j : \min\left(\sum_k U_k \cdot R(u_k(D_j)) : D_j \notin S \wedge D_j \notin D_{1..j-1}\right)$$

Calculate Impressions to Apply

At block 865, processing logic determines an advertising weight to apply to the treatment groups for an experimental or local ad campaign that will be run in parallel to the national ad campaign. This is calculated using methods described earlier.

Apply Advertising Impressions

At block 870, advertisements are applied to the treatment groups. At block 875, processing logic measures advertising results for the treatment groups and for the control groups. At block 880, processing logic then determines sales metrics (e.g., lift) attributable to the national ad campaign.

Calculate Local Lift

The objective may be to create a detectible increase in the sales per capita in the treatment groups, compared to the control groups. Based on the size of this increase, processing logic can measure how well TV advertising is driving sales, and then estimate the unknown (but simultaneously executing) national effects. Let $\Delta Q_N(d,t_1,t_2)$ be the quantity per capita per week that is occurring in a local area d between time $t_1$ and $t_2$ due to $I_N$ impressions of national TV. Let E be the quantity per capita per week that is occurring in a local area d without TV. The total quantity that is observed in area d is therefore $Q_{N+}(d, t_1, t_2) = E + \Delta Q_N$. The quantity per capita per week produced by $I_N$ is an unknown function $f$, such that:

$$Q_{N+}(d,t_1,t_2) = \Delta Q_N(d,t_1,t_2) + E = f(I_N) + E$$

In order to make the quantity measurable, processing logic will inject an additional amount of local impressions per capita per week $I_L$ into the treatment group d using local ad insertion systems, which produce a local revenue per capita per week of $\Delta Q_L(d,t_1,t_2)$. Let $\Delta Q_{L+}(d,t_1,t_2)$ be the total revenue now observed in the treatment group inclusive of local and national ads, where $Q_{L+}(d, t_1, t_2) = \Delta Q_L(d, t_1, t_2) + \Delta Q_N(d, t_1, t_2) + E = f(I_N) + E$. We now have:

$$\Delta Q_L(d,t_1,t_2) = Q_{L+}(d,t_1,t_2) - Q_{N+}(d,t_1,t_2)$$

Calculate National Lift

In the above formula, the quantity $Q_{L+}$ per capita per week in the treatment group is observable. The value $Q_{N+}$ is not directly observable. However, processing logic can use the performance observable at the control groups D(d) that are matched to the treatment group to determine $Q_{N+}$. This results in the following equation:

$$\Delta Q_L(d,t_1,t_2) = Q_{L+}(d,t_1,t_2) - Q_{N+}(D(d),t_1,t_2)$$

where $Q_{L+}$ and $Q_{N+}$ are both observable and an impression concentration (ad weight) of $\Delta I_L(d)$ has been used. This provides an observation between impressions and quantity at a point higher than the national impressions. From this, the national impressions can be inferred.

In one embodiment, in order to infer $\Delta Q_N$, which is running with $\Delta I_N(N)$, it can be useful to know something about the shape of the TV impression to quantity function $f$. Ordinarily, a linear assumption for an advertising response would lead to unrealistically optimistic estimates. However, since processing logic is extrapolating downwards, the diminishing returns observation does not render the estimate unrealistic. Assuming diminishing returns as advertising increases, a linear fit to the observed data actually becomes a lower bound on the lift produced by the national ad impressions. Accordingly, an estimate of the function can be computed as follows:

$$\Delta Q_L = f(I_L); \Delta Q_L = cI_L; c = \frac{\Delta Q_L}{I_L}$$

The estimate for national quantity per capita per week $\Delta Q_N$, can then be calculated based on empirical observations in the treatment groups and control groups. Assuming multiple controls per treatment group $D_i(d_j)$, and multiple treatment groups $d_j$, and assuming $s(d_j)$ is a scale-up relating to the difference in cable penetration between the groups, we have the following:

$$\Delta Q_N(t_1, t_2) = c \cdot I_N = \frac{1}{J} \sum_{j=1}^{J} \left[ s(d_j) \cdot \frac{\Delta Q_L(d_j, t_1, t_2)}{\Delta I_L} \right] \cdot I_N$$

if $\Delta Q_N \le 0$ then $\Delta Q_N = 0$ if $\Delta Q_N \ge Q_{N+}$ then $\Delta Q_N = Q_{N+}$ $$\frac{\Delta Q_L(d_j, t_1, t_2)}{\Delta I_L} = \frac{[Q(d_j, t_i) - Q(D_j, t_1)] - \left[\frac{1}{I}\sum_{i=1}^{I} Q(D_i(d_j), t_2) - Q(D_i(d_j), t_1)\right]}{[I(d_j, t_2) - I(d_j, t_1)] - \left[\frac{1}{I}\sum_{i=1}^{I} I(D_i(d_j), t_2) - I(D_i(d_j), t_1)\right]}$$

FIG. 15 illustrates a lift tracking report 1500 that shows treatment verses control over time and reports on the lift being generated, according to one embodiment. The lift tracking report 1500 may be shown in a user interface that includes multiple different drop down menus that enable a user to change one or more properties for tracking lift.

Figure 10:
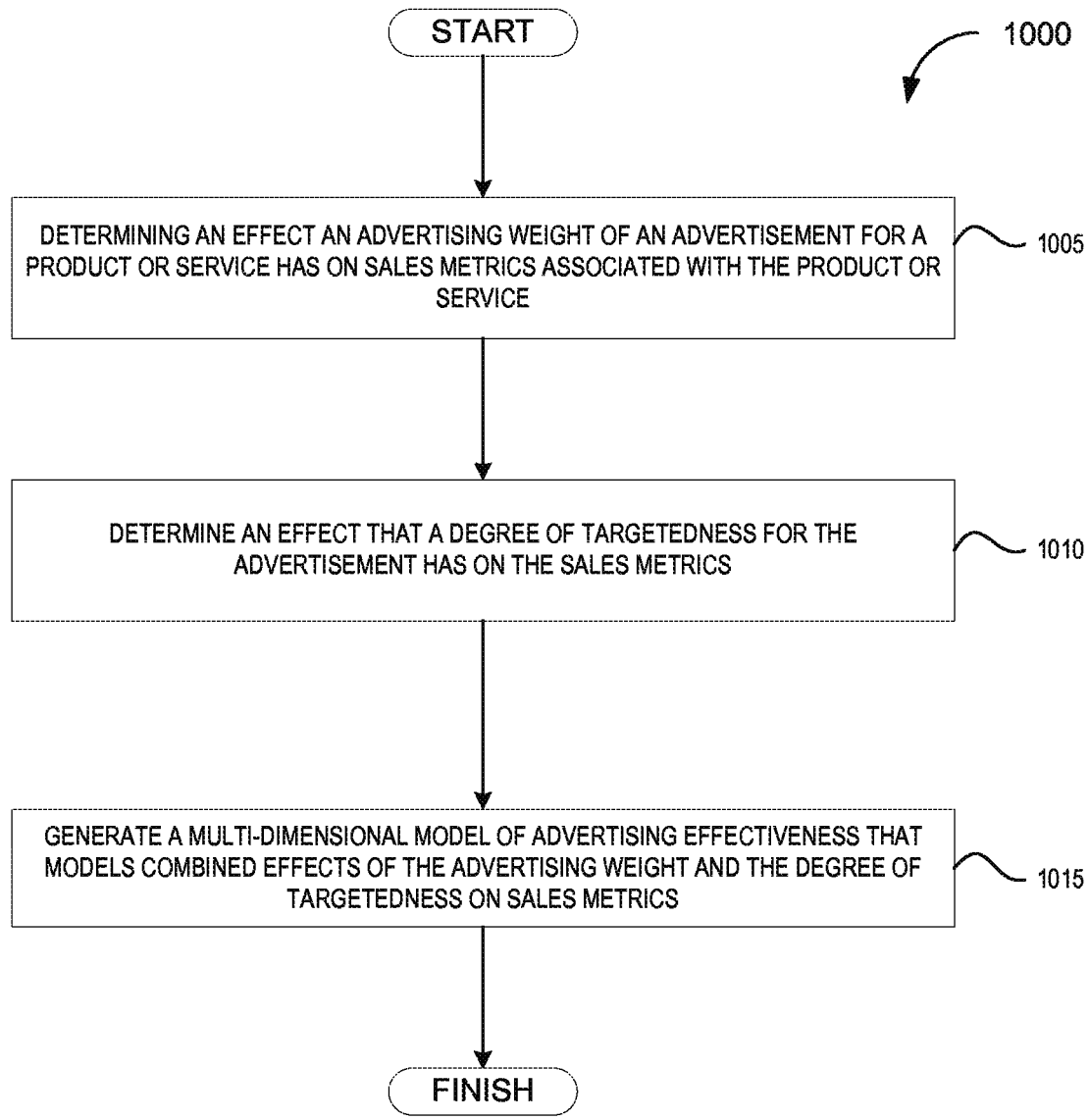
FIG. 10 is a flow diagram illustrating a method for developing a model for an advertisement landscape, according to one embodiment.

FIG. 10 is a flow diagram illustrating a method 1000 for developing a model for an advertisement landscape, according to one embodiment. The method 1000 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to generate a multi-dimensional model (e.g., an advertisement landscape). In one embodiment, method 1000 may be performed by a processor, as shown in FIG. 19.

What-if Analysis

It may be useful for an advertiser to be able to conduct "what-if" analyses on what would happen if the advertiser used different media concentrations and degrees of targeting in their advertising campaign. In one embodiment, in order to provide this information to the user, an interpolated or multi-dimensional model of the discrete measured cells may be developed. This multi-dimensional model may be an "advertisement landscape" may be general function mapping from any impression concentration (e.g., advertising weight) and tratio to a prediction of the expected incremental sales due to television media on each channel.

Target-Weight Model Construction

In the preceding discussion we discussed calculation of national and local lift, and how this can be done by direct observation of experimental markets. We will now discuss the construction of a target-weight model which combines degree-of-targeting with advertising weight. In order to create this landscape, we will use the observed local impressions and local lift to form data points to infer a general function mapping ad weight and targeting to conversions.

The target-weight landscape is one which makes predictions for a plurality of targeting values, and so can be used to optimize targeting in an advertising campaign as described earlier.

The lift model may have two main components, a concentration or advertising weight component and a targeting component. It would be typical for both of these variables to have a positive relationship with conversions. The more impressions that are generated against a population, the higher may be the lift from that population. In addition, the more targeted is the media, the more lift may be generated.

At block 1005 of method 1000, processing logic determines the effect that an advertising weight (e.g., a concentration or number of advertisements) for a product or service has on sales metrics associated with the product or service. For example, processing logic may determine whether a high concentration of advertisements affected sales metrics for a product or service (e.g., affected the number of products sold). The concentration component may be modeled as an exponential model:

$$a_1 \cdot \left(1 - \frac{1}{e^{a_2 \cdot I_N(t)}}\right) \cdot k \cdot s(t)$$

where "k" may be a keep-rate and may indicate what percentage of customers retain a service or subscription. Because there are diminishing returns at higher levels of advertising (e.g., higher concentrations), an exponential model may better represent the diminishing returns. $I_N$ includes the impression concentrations being generated in a geographic area (national). The exponential model may include a seasonal component s(t). This suggests that as sales increase due to events in the world such as Christmas, the lift from advertising also increases.

At block 1010, the processing logic determines an effect that a degree of targetedness has on the sales metrics. For example, processing logic may determine whether selecting areas with viewers which have demographics similar to typical buyers of a product resulted in additional sales of the product. The second major part of the model is the targeting component. As the media is better targeted, there is higher lift. The targeting component may be represented as follows:

$$(T \cdot (\theta(t) - B) + 1)$$

At block 1015, processing logic may generate a multi-dimensional model (e.g., a landscape) of advertising effectiveness that models combined effects of the advertising weight and the degree of targetedness on the sales metrics. In one embodiment, the multi-dimensional model (e.g., the landscape) may be a general function mapping any impression concentration (e.g., advertising weight) and degree of targetedness (e.g., tratio) to a prediction of the expected incremental sales due to television media on each channel. The an exponential version of the lift model which includes both the concentration component and the targeting component as shown below:

$$\%q_N(t) = (T \cdot (\theta(t) - B) + 1) \cdot a_1 \cdot \left(1 - \frac{1}{e^{a_2 \cdot I_N(t)}}\right) \cdot k \cdot s(t)$$

where θ(t) is the tratio for the impressions applied at time t nationally, T is the tratio slope, B is the base tratio at no targeting advantage, $a_1$ is the exponential intercept and $a_2$ is exponential slope. Additionally, $I_N(t)$ is the impression concentration applied at time t nationally in units of impressions per thousand households, k is the keep rate (e.g., the rate in which customers retain subscriptions or services) and s(t) represents seasonality which is the sales without media at time t2 divided by sales without media at time t1. A linear version of the lift model may be defined as follows:

$$\%q_N(t) = (T \cdot (\theta(t) - B) + 1) \cdot a_3 \cdot I_N(t) \cdot k \cdot s(t)$$

TCPM Needed to Achieve CPA Goal

It is now possible to calculate several useful quantities. The first is the "tcpm needed for a goal" (e.g., a CPA goal). This enables all available media inventory to be scored, and to be compared to the tCPM that is needed for the goal. In that way, it is then possible to calculate the % discount that will need to be negotiated for each media, in order for it to meet a particular CPA performance goal. The tcpm needed to achieve CPA goal may be derived from the exponential and linear lift models to provide the formulae below:

$$tcpm^*(t_2) = \frac{1,000,000}{TVHH_N} \cdot CPAGoal^* \cdot \Delta q_N / (\theta(t_2) \cdot I_N(t_2))$$

$$tcpm^*(t_2) =$$

$$1000 \cdot CPAGoal^* \cdot \left(\frac{1000 \cdot a_3}{TVHH_N}\right) \cdot k \cdot s(t_2) \cdot q_N(t_1) \cdot s(t_2) \cdot (T \cdot (\theta(t_2) - B) + 1) / \theta(t_2)$$

CPM Needed to Achieve CPA Goal

The "cpm discounts needed for a goal" are also useful. These enable negotiators and auctions systems to know what CPM they need to offer in order for the media to meet the CPA goals. This may also be derived using the exponential and linear lift models. It may be useful to calculate the discount % needed to be applied to a set of CPM prices for TV media that will allow the advertising campaign to achieve its CPA goals. These discounts can be calculated as follows:

cpm*(p)=cpm(p)*(tcpmcurrent(t2)/tcpm*(t2))

% DiscountNeededForCPA(p)=100*(cpm*(p)/cpm (p)-1)

Measurement of Ad Elasticity

One type of measurement result that can be used for advertising optimization is a real-time advertising elasticity measurement. Elasticity estimates may be useful during a rollout when elastic changes have been assumed. By deploying some test areas to track elasticity, it may be possible to quantify the elastic changes and to verify that they did or did not take place with the magnitude expected. In addition, these can be used by an advertiser to identify that they have entered into a higher elasticity period, in which case they may be able to exploit the current market conditions to produce greater results than may have previously been possible. Advertising elasticity can be calculated using the tracking cells that we have already defined as follows:

$$\varepsilon = \frac{d \% q_L}{dI} \cdot \left(\frac{\% q_N}{I_N}\right) = \frac{1}{J}\sum_{j=1}^{J}\left(\frac{\% q_L(d_j, t_1, t_2)}{I_L(d_j, t_2)}\right)\left(\frac{q_N}{I_N}\right)$$

The elasticity may change based on the current national rollout spend. However, the derivative may remain globally constant and can provide an estimate on the favorability of the current conditions, regardless of what current spend is underway. An estimate of lift responsiveness to advertising that is invariant to the current national rollout is given by:

$$\frac{d\% \, q_L}{dI} = \frac{1}{J} \sum_{j=1}^{J} \left( \frac{\% \, q_L(d_j, t_1, t_2)}{I_L(d_j, t_2)} \right)$$

When measuring the advertising elasticity, local areas should be deployed with a constant impression concentration that is maintained throughout the period of interest. Table 7 below illustrates an exemplary local media plan designed for elasticity measurement.

TABLE 7

| Week | 1 | 2 | 3 |
|---|---|---|---|
| National impression concentration | 600 | 800 | 200 |
| Local impression concentration | 100 | 200 | 200 |

Ad elasticity can be used to take measurements of what the current local area response to advertising is. If the environment changes, and much higher levels of ad elasticity are measured, then the advertiser knows that they can then increase their national campaign ad weight, and be able to still achieve their revenue or CPA goals. As a result, local ad elasticity estimation can help to achieve significant performance gains in a national campaign.

Halo Calculation

Another type of measurement that may be useful, and is available due to local lift, is the halo effect measurement. The "halo effect" may refer to the propensity for TV to produce conversions that are on a wide range of other channels. For example, there might be 2 phone calls on Toll Free Numbers, but an additional 4 conversions might occur on the web, and 1 additional phone-call to the general brand phone number. Advertisers may want to know how many additional sales are occurring on other channels.

The halo effect for phone conversions may be equal to the number of additional conversions that are generated following a media-generated phone conversion and may calculated as follows:

Halo = extra−conversions−on− other−channels−due−to−media/*phoneconversions*− due−to−media = (*allconversions*−on−all−channels−due−to−media −

*phoneconversions*−due−to−media)/*phoneconversions*−due−to−media =

*allconversions*−on−all−channels−due− to−media/*phoneconversions*−due−to−media − 1

The halo effect may be determined using two steps. First, a phone conversions model is defined as:

PhoneConversions(*I*)=phoneconversionsperimp*\*I*

The phone conversion model may predict, for any number of impressions, the number of phone conversions that may be generated. The phone conversion model may predict the number of DRTV phone conversions generated for any number of impressions. Phone conversions may be uniquely tracked by 1-800 numbers that identify the station and sometimes the program which generated the call.

Next, the all conversions model is defined as

AllConversions(*I*)=allconversionsperimp*\*I*

Using the phone conversions model and the all conversions model, the halo effect can be defined as:

$$\text{Halo} = \frac{\text{allconversionsperimp}}{\text{phoneconversionsperimp}} - 1$$

Residual (Delayed Conversion) Estimates

Another useful measurement is residual estimation. Residual estimation may indicate the number of sales which occurred after an advertisement campaigned has stopped running (e.g., residual sales resulting from the residual effects of the advertisement campaign).

SUMMARY

Figure 16:
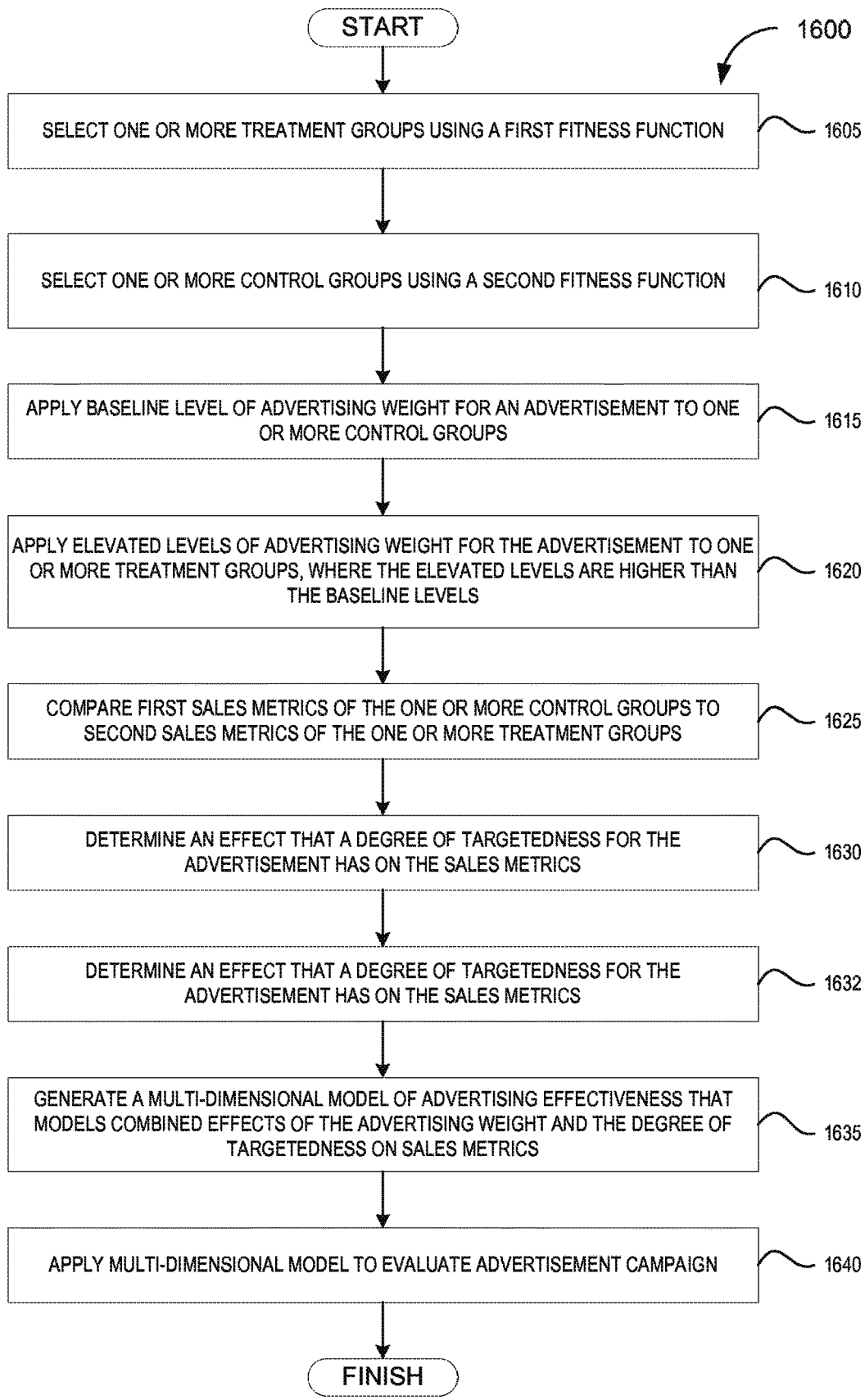
FIG. 16 is a flow diagram illustrating a method or developing a model for an advertisement landscape, according to one embodiment.

FIG. 16 is a flow diagram illustrating a method 1600 for developing a model for an advertisement landscape, according to another embodiment. The method 1600 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to generate a multi-dimensional model (e.g., an advertisement landscape). In one embodiment, method 1600 may be performed by a processor, as shown in FIG. 19.

The method 1600 starts at block 1605, where processing logic selects one or more treatment groups using a first fitness function. The first fitness function may evaluate the one or more treatment groups based on at least one of: advertising costs, geographic distance from other treatment groups, population of the group, sales per capita for the group, difference between national census demographics and the demographics of the group, or a degree of targetedness. In one embodiment, the selected treatment groups include "degree of targetedness treatment groups" and "ad weight treatment groups." The degree of targetedness treatment groups will vary from control groups in terms of degree of targetedness (e.g., tratio). Ad weight treatment groups will vary from control groups by an advertising weight. Some treatment groups may be both degree of targetedness treatment groups and ad weight treatment groups.

At block 1610, processing logic selects one or more control groups using a second fitness function. The second fitness function may evaluate the one or more control groups based on at least one of: geographic distance of the group from the one or more treatment groups, demographic disparity between the group and the one or more control groups, or a cable disparity between the group and the one or more treatment groups.

At block 1615, processing logic applies a baseline level of advertising weight (e.g., a baseline concentration) to the one or more control groups. At block 1620, processing logic applies elevated levels of advertising weight for the advertisement to the one or more treatment groups. Different elevated levels may be applied to the different ad weight treatment groups. In one embodiment, the elevated levels may be higher than the baseline levels. At block 1625, the sales metrics of the one or more control groups are compared to the sales metrics of the one or more treatment groups.

At block 1630, processing logic determines an effect that a degree of targetedness (e.g., a tratio) has on the sales metrics. As discussed above, the degree of targetedness may be the probability that a sale of a product or service will be made as a result of a view being exposed to an advertisement. For example, processing logic may determine whether selecting areas with viewers which have demographics similar to typical buyers of a product, resulted in additional sales of the product. At block 1632, processing logic determines an effect that the advertising weight has on the sales metrics. At block 1635, processing logic may generate a multi-dimensional model (e.g., a landscape) of advertising effectiveness that models combined effects of the advertising weight and the degree of targetedness on the sales metrics. Multiple different types of multi-dimensional models have been discussed above with reference to FIG. 15.

At block 1640, processing logic may apply the multi-dimensional model to evaluate an advertisement campaign. For example, processing logic may input one or more parameters for a national ad campaign into the multi-dimensional model to receive an output. The output may identify predicted sales metrics based on the input parameters. Additionally, the multi-dimensional model may be used to account for differences in targetedness and advertising weights between a national ad campaign and experimental local ad campaigns.

In one embodiment, processing logic may combine the multi-dimensional model with inventory availability data (e.g., data about the current stock of inventory in one or more areas) and may predict the future inventors for the product or service based on a particular advertising weight and a particular degree of targetedness, using the multi-dimensional model. For example, if the user selects a different advertising weight and a different degree of targetedness, processing logic may predict the change in inventory level (e.g., the amount of increase or reduction in the inventory level) based on the advertising weight and a different degree of targetedness. In another example, if advertising weight (e.g., concentration) is increased and degree of targetedness is increased, this may result in a higher amount of sales, and processing logic may predict that the future inventory will be lower, due to the increased sales.

In another embodiment, processing logic may provide a user interface with controls to adjust at least one of the advertising budget, the advertising weight, and the degree of targetedness. Processing logic may receive an adjustment to one or more of the advertising budget, the advertising weight, and the degree of targetedness, and may provide predictions of future sales metrics based on the adjustment. For example, processing logic may receive an adjustment lowering the advertising weight (e.g., the concentration) and may predict that sales will drop by a certain amount due to the decrease in advertising weight.

Figure 17:
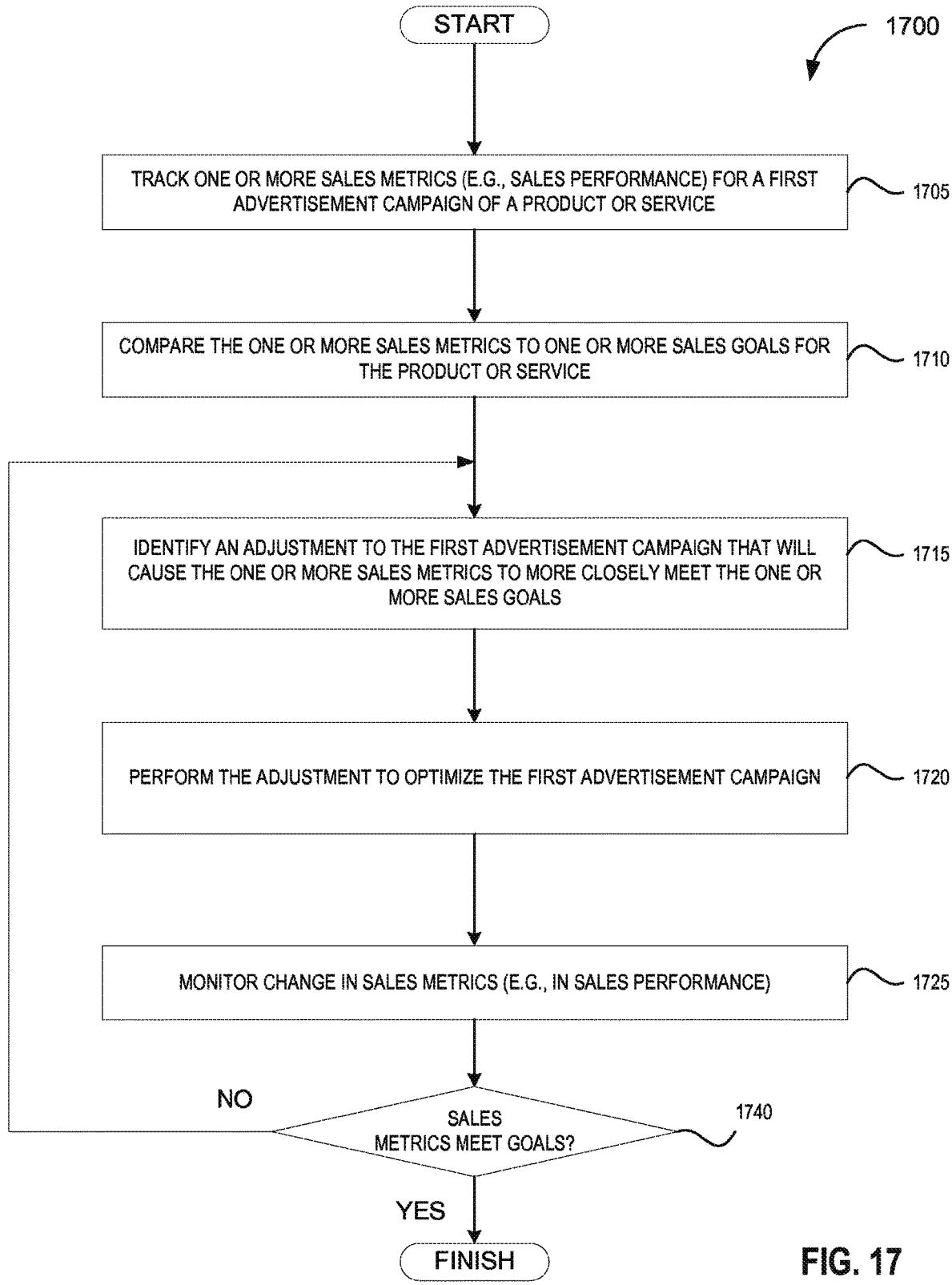
FIG. 17 is a flow diagram illustrating a method for optimizing a media campaign, according to one embodiment.

FIG. 17 is a flow diagram illustrating a method 1700 for optimizing a media campaign, according to one embodiment. The method 1700 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to optimize a media campaign. In one embodiment, method 1700 may be performed by a processor, as shown in FIG. 19.

The method 1700 starts at block 1705, where processing logic tracks one or more sales metrics (e.g., sales performance) for a product or service based on differences between a first advertising result for a control group and a second advertisement result for a treatment group. The control group is subject to a first advertisement campaign and the treatment group is subject to the first advertisement campaign and to a second advertisement campaign. For example, processing logic may track the cost per impression (cpi), or the cost per acquisition (cpa), etc. At block 1710, processing logic compares the one or more sales metrics to one or more sales goals for the product or service. For example, processing logic may determine whether the cpa for the treatment group is below a certain threshold.

At block 1715, processing logic identifies an adjustment to the first advertisement campaign that will cause the one or more sales metrics to more closely meet the one or more sales goals. For example, if a sales goal is to have 100 sales of a product, and only 55 products have been sold, the processing logic may determine that the advertisement weight of the first advertisement campaign should be adjusted (e.g., the advertisement weight or concentration should be increased to generate more impressions which may result in more sales). At block 1720, processing logic performs the adjustment to optimize the first advertisement campaign (e.g., to cause the one or more sales metrics to change such that they are closer to the one or sales goals).

In one embodiment, processing logic may automatically reduce the advertising weight if it is determined that the CPI of the first advertisement campaign is below a first threshold, or may automatically increase the advertising if the CPI of the first advertisement campaign is above the first threshold or a second threshold. In another embodiment, processing logic may automatically adjust the degree of targetedness for the first advertisement campaign. Processing logic may additionally make a prediction of an advertising weight that will cause the one or more sales metrics to meet the one or more sales goals and may automatically adjust the advertisement weight, based on the prediction.

In one embodiment, processing logic may test an adjustment to the first advertisement campaign by applying the adjustment to the second advertisement campaign. Processing logic may compare a new advertising result associated with the treatment group with the first advertising result and may apply the adjustment if the new advertising result is superior to or better than the first advertising result. In another embodiment, processing logic measures changes in a difference between the first advertising result and the second advertising result that occur without changes to the first advertisement campaign or the second advertisement campaign.

At block 1725, processing logic monitors a change in the sales metrics that occurs in response to the adjustment that was made at block 1720. At block 1740, processing logic determines whether the updated sales metrics meet the sales goals. If not, the method returns to block 1715 to perform an additional adjustment to the first advertisement campaign. If the sales metrics meet the sales goals, then the method may end.

Figure 18:
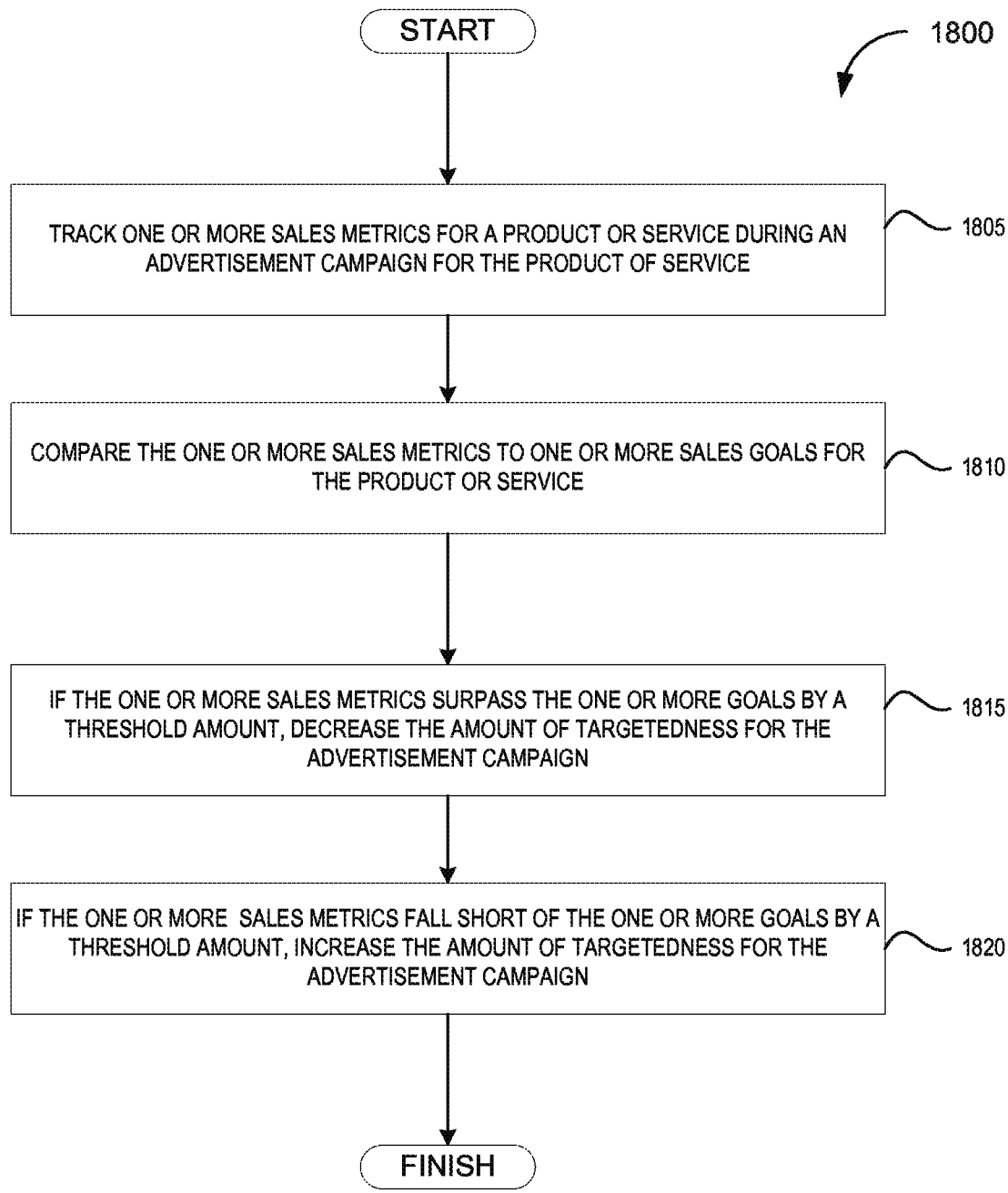
FIG. 18 is a flow diagram illustrating a method for optimizing a media campaign, according to another embodiment.

FIG. 18 is a flow diagram illustrating a method 1800 for optimizing a media campaign, according to another embodiment. The method 1800 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to optimize a media campaign. In one embodiment, method 1800 may be performed by a processor, as shown in FIG. 19.

The method 1800 starts at block 1805, where processing logic tracks one or more sales metrics for a product or service during an advertisement campaign. For example, processing logic may track the total amount of sales, the costs of the advertisement campaign, etc. At block 1810, processing logic compares the one or more sales metrics to the one or more sales goals for the product or service. For example, processing logic may determine whether total amount of sales meets a sales goal. In another example, processing logic may determine whether the cost of the advertisement campaign exceeds a certain cost.

At block 1815, if the one or more sales metrics surpass the one or more goals by a threshold amount, processing logic may decrease the amount of targetedness for the advertisement campaign. For example, if the cost per impression is below a target (e.g., is lower than the goal), the processing logic may decrease the targetedness of the advertisement campaign. At block 1820, if the one or more sales metrics falls short of the one or more goals by a threshold amount, processing logic may increase the amount of targetedness for the advertisement campaign. For example, if the cost per impression is above the target cost per impression, processing logic may increase the targetedness of the advertisement campaign. After block 1820, the method ends.

FIGS. 2, 8A-8B, 10 and 16-18 are flow diagrams illustrating methods for tracking and managing advertisement campaigns. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 19 illustrates a diagrammatic representation of a machine in the exemplary form of a computer system 1900 within which a set of instructions, for causing the machine to perform any one or more of the methodologies discussed herein, may be executed. The system 1900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1900 includes a processing device (e.g., one or more processors) 1902, a main memory 1904 (e.g., read-only memory (ROM), flash memory, dynamic random access memory (DRAM) such as synchronous DRAM (SDRAM)), a static memory 1906 (e.g., flash memory, static random access memory (SRAM)), and a data storage device 1918, which communicate with each other via a bus 1930.

Processing device 1902 represents one or more general-purpose processors such as a microprocessor, central processing unit, or the like. More particularly, the processing device 1902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1902 may also be one or more special-purpose processing devices such as an application specific integrated circuit (ASIC), a field programmable gate array (FPGA), a digital signal processor (DSP), network processor, or the like. The processing device 1902 is configured to execute the instructions 1926 for performing the operations and steps discussed herein.

The computer system 1900 may further include a network interface device 1908 which may communicate with a network 1920. The computer system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse, a touch screen, a touch pad, a stylus, etc.), and a signal generation device 1916 (e.g., a speaker).

The data storage device 1918 may include a computer-readable storage medium 1928 on which is stored one or more sets of instructions (e.g., instructions 1926 for an analytics engine 1990) embodying any one or more of the methodologies or functions described herein. The instructions 1926 may also reside, completely or at least partially, within the main memory 1904 and/or within the processing device 1902 during execution thereof by the computer system 1900, the main memory 1904 and the processing device 1902 also constituting computer-readable media. The instructions may further be transmitted or received over a network 1920 via the network interface device 1908.

While the computer-readable storage medium 1928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "determining," "calculating," "introducing," "providing," "selecting," "updating," "adjusting," "modifying," "computing," "using," "applying," "comparing," "analyzing," "tracking," "incorporating," "combining," "predicting," "performing," "reducing," "increasing," "making," "monitoring," "maintaining," "updating," "testing," "measuring," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical media, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    selecting, by a processor of a computing device, a control population of persons and a targeted population of persons, the targeted population of persons being different than the control population of persons;
    broadcasting, on a broadcast medium, a first plurality of media data elements associated with a product or service to the control population and a second plurality of media data elements associated with the product or service to the targeted population;
    receiving, at a feed repository, viewer data related to the broadcasting over a time period;
    loading the viewer data into an intermediate format for cleansing, adding identifiers, and extracting personal identifiable information, the personal identifiable information being routed to a separate secure storage pipeline;
    generating, by the computing device, a first model comprising an effect that a concentration of a media data element electronically distributed to the selected population for the product or service has on conversion metrics data by comparing the viewer data;
    calculating, for the media data element, a degree of targetedness measuring how close the population of persons is to a determined target of an advertiser;
    generating, by the computing device in real-time, a second model comprising an effect that the degree of targetedness has on the conversion metrics data;
    generating, by the computing device, a multi-dimensional model based on the first model and the second model that determines combined effects of the concentration of the media data element and the degree of targetedness on the conversion metrics data;
    generating, for a graphical user interface, a dynamic report that displays the combined effects of the concentration of the media data element and the degree of targetedness on the conversion metrics data, wherein the graphical user interface receives input for properties related to the combined effects;
    combining conversion estimates generated based on the multi-dimensional model with inventory quantity availability data for the product or service;
    predicting, by an analytics engine, future inventory quantities for the product or service based at least on the combined conversion estimates and a planned application of the concentration of media data elements;
    transmitting the concentration of media data elements for broadcasting based on the predicted future inventory quantities;
    receiving, at the graphical user interface, an input by the user that adjusts one or more of the properties related to the combined effects, the one or more properties comprising an advertising budget or advertising weight;
    automatically modifying in real time, by the processor, the broadcasting of the concentration of media data elements based on optimizing the broadcasting to meet the adjusted one or more properties input by the user; and
    generating, for the graphical user interface, an updated dynamic report that displays the updated combined effects of the automatically modified broadcasting, based on updated viewer data of the product or service.

2. The method of claim 1, further comprising determining a media impression concentration that the population has received from a media data element for the product or service over the time period, wherein the media impression concentration is based on a number of impressions delivered to the population, wherein the concentration of the media data element is the media impression concentration.

3. The method of claim 1, wherein determining the effect that the concentration of the media data element has on the conversion metrics comprises:
    applying a baseline level of concentration of the media data element to one or more control groups;

applying elevated levels of concentration of the media data element that are higher than the baseline level to one or more treatment groups at a same degree of targetedness; and comparing first conversion metrics of the one or more control groups to second conversion metrics of the one or more treatment groups.

4. The method of claim 3, further comprising:

selecting the one or more treatment groups using a first fitness function that evaluates a suitability of a group for use as a treatment group based on at least one of media data element cost associated with the group, geographic distance of the group from other treatment groups, conversions per capita for the group, difference between a national census demographic average and demographics of the group, or a degree of targetedness; and selecting the one or more control groups using a second fitness function that evaluates a suitability of a group for use as a control group based on at least one of geographic distance of the group from the one or more treatment groups, demographic disparity between the group and the one or more control groups, or a cable penetration disparity between the group and the one or more treatment groups.

5. The method of claim 3, further comprising:

analyzing historical conversions for the one or more treatment groups to determine a historical variability in conversions metrics for the one or more treatment groups; and determining the elevated levels of concentration of the media data element that will cause the second conversions metrics to be outside of the historical variability.

6. The method of claim 3, further comprising:

after a time period, reducing the concentration of the media data element for the one or more treatment groups to the baseline level;

tracking an amount of time that it takes for the second conversion metrics to decline to levels of the first conversion metrics;

calculating residual conversion associated with the elevated levels of concentration of the media data element based on the amount of time; and incorporating the residual conversion into the multi-dimensional model.

7. The method of claim 1, wherein determining the effect of the degree of targetedness comprises:

selecting a first population of persons with high degree of targetedness, applying a particular concentration of the media data element to the first population, and determining first conversion metrics from the first population;

selecting a second population of persons with low degree of targetedness, applying the particular concentration of the media data element to the second population, and determining second conversion metrics from the second population; and comparing the first conversion metrics to the second conversion metrics.

8. The method of claim 7, wherein the degree of targetedness is calculated as a correlation coefficient between a vector of consumer demographics for the product or service and a corresponding vector of viewer demographics for viewers of the media data element.

9. The method of claim 7, further comprising:

selecting the first population of persons using a first fitness function that evaluates a suitability of a group for use as a control group based on at least one of geographic distance of the group from one or more treatment groups, matched movement of conversion metrics to the one or more treatment groups, demographic disparity between the group and the one or more treatment groups, or a cable penetration disparity between the group and the one or more treatment groups; and selecting the second population of persons using a second fitness function that evaluates a suitability of a group for use as a treatment group based on at least one of media data element cost associated with the group, geographic distance of the group from other treatment groups, population of the group, conversions per capita for the group, difference between national census demographic average and demographics of the group, or a degree of correlation between consumer demographics and viewer demographics for the group.

10. A tangible, non-transitory computer readable storage medium storing instructions that, when executed by a computing system, causes the computing system to perform operations of a method comprising:

selecting, by a processor of a computing device, a control population of persons and a targeted population of persons, the targeted population of persons being different than the control population of persons;

broadcasting, on a broadcast medium, a first plurality of media data elements associated with a product or service to the control population and a second plurality of media data elements associated with the product or service to the targeted population;

receiving, at a feed repository, viewer data related to the broadcasting over a time period;

loading the viewer data into an intermediate format for cleansing, adding identifiers, and extracting personal identifiable information, the personal identifiable information being routed to a separate secure storage pipeline;

generating, by the computing device, a first model comprising an effect that a concentration of a media data element electronically distributed to the selected population for the product or service has on conversion metrics data by comparing the viewer data;

calculating, for the media data element, a degree of targetedness measuring how close the population of persons is to a determined target of an advertiser;

generating, by the computing device in real-time, a second model comprising an effect that the degree of targetedness has on the conversion metrics data;

generating, by the computing device, a multi-dimensional model based on the first model and the second model that determines combined effects of the concentration of the media data element and the degree of targetedness on the conversion metrics data;

generating, for a graphical user interface, a dynamic report that displays the combined effects of the concentration of the media data element and the degree of targetedness on the conversion metrics data, wherein the graphical user interface receives input for properties related to the combined effects;

combining conversion estimates generated based on the multi-dimensional model with inventory quantity availability data for the product or service;

predicting, by an analytics engine, future inventory quantities for the product or service based at least on the combined conversion estimates and a planned application of the concentration of media data elements;

transmitting the concentration of media data elements for broadcasting based on the predicted future inventory quantities;

receiving, at the graphical user interface, an input by the user that adjusts one or more of the properties related to the combined effects, the one or more properties comprising an advertising budget or advertising weight;

automatically modifying in real time, by the processor, the broadcasting of the concentration of media data elements based on optimizing the broadcasting to meet the adjusted one or more properties input by the user; and generating, for the graphical user interface, an updated dynamic report that displays the updated combined effects of the automatically modified broadcasting, based on updated viewer data of the product or service.

11. The computer readable storage medium of claim 10, the operations further comprising determining a media impression concentration that the population has received from a media data element for the product or service over the time period, wherein the media impression concentration is based on a number of impressions delivered to the population, wherein the concentration of the media data element is the media impression concentration.

12. The computer readable storage medium of claim 10, wherein determining the effect that the concentration of the media data element has on the conversion metrics comprises:

applying a baseline level of concentration of the media data element to one or more control groups;

applying elevated levels of concentration of the media data element that are higher than the baseline level to one or more treatment groups; and comparing first conversion metrics of the one or more control groups to second conversion metrics of the one or more treatment groups.

13. The computer readable storage medium of claim 12, the operations further comprising:

selecting the one or more treatment groups using a first fitness function that evaluates a suitability of a group for use as a treatment group based on at least one of media data element cost associated with the group, geographic distance of the group from other treatment groups, population of the group, conversions per capita for the group, difference between a national census demographic average and demographics of the group, or a degree of targetedness; and selecting the one or more control groups using a second fitness function that evaluates a suitability of a group for use as a control group based on at least one of geographic distance of the group from the one or more treatment groups, demographic disparity between the group and the one or more control groups, or a cable penetration disparity between the group and the one or more treatment groups.

14. The computer readable storage medium of claim 12, the operations further comprising:

analyzing historical conversions for the one or more treatment groups to determine a historical variability in conversion metrics for the one or more treatment groups; and determining the elevated levels of concentration of the media data element that will cause the second conversion metrics to be outside of the historical variability.

15. The computer readable storage medium of claim 12, the operations further comprising:

after a time period, reducing the concentration of the media data element for the one or more treatment groups to the baseline level;

tracking an amount of time that it takes for the second conversion metrics to decline to levels of the first conversion metrics; and calculating residual conversions associated with the elevated levels of concentration of the media data element based on the amount of time; and incorporating the residual conversions into the multi-dimensional model.

16. The computer readable storage medium of claim 10, wherein the degree of targetedness comprises a calculated correlation coefficient between a vector of consumer demographics for the product or service and a corresponding vector of viewer demographics for viewers of the media data element.

17. The computer readable storage medium of claim 16, wherein determining the effect that the degree of correlation between the consumer demographics and the viewer demographics has on the conversion metrics comprises:

selecting first media with high correlation coefficient, and concentration of the media data element to the first media;

selecting second media with low correlation coefficient, and applying concentration of the media data element to the second media; and comparing first conversion metrics associated with the first media to second conversion metrics associated with the second media.

18. The computer readable storage medium of claim 17, the operations further comprising:

selecting the first media using a first fitness function that evaluates a suitability of media to use in a control group based on at least one of geographic distance of the group from one or more treatment groups, matched movement of conversion metrics to the one or more treatment groups, demographic disparity between the group and the one or more treatment groups, or a cable penetration disparity between the group and the one or more treatment groups; and selecting the second media using a second fitness function that evaluates a suitability of a media to use in a treatment group based on at least one of media data element cost associated with the group, geographic distance of the group from other treatment groups, population of the group, conversions per capita for the group, difference between national census demographic average and demographics of the group, or a degree of correlation between the consumer demographics and the viewer demographics for the group.

19. A system comprising a data storage device storing instructions for a method in an electronic storage medium and a processor of a computing device configured to execute the instructions to perform a method including:

selecting, by the processor of the computing device, a control population of persons and a targeted population of persons, the targeted population of persons being different than the control population of persons;

broadcasting, on a broadcast medium, a first plurality of media data elements associated with a product or service to the control population and a second plurality of media data elements associated with the product or service to the targeted population;

receiving, at a feed repository, viewer data related to the broadcasting over a time period;

loading the viewer data into an intermediate format for cleansing, adding identifiers, and extracting personal identifiable information, the personal identifiable information being routed to a separate secure storage pipeline;

generating, by the computing device, a first model comprising an effect that a concentration of a media data element electronically distributed to the selected population for the product or service has on conversion metrics data by comparing the viewer data;

calculating, for the media data element, a degree of targetedness measuring how close the population of persons is to a determined target of an advertiser;

generating, by the computing device in real-time, a second model comprising an effect that the degree of targetedness has on the conversion metrics data;

generating, by the computing device, a multi-dimensional model based on the first model and the second model that determines combined effects of the concentration of the media data element and the degree of targetedness on the conversion metrics data;

generating, for a graphical user interface, a dynamic report that displays the combined effects of the concentration of the media data element and the degree of targetedness on the conversion metrics data, wherein the graphical user interface receives input for properties related to the combined effects;

combining conversion estimates generated based on the multi-dimensional model with inventory quantity availability data for the product or service;

predicting, by an analytics engine, future inventory quantities for the product or service based at least on the combined conversion estimates and a planned application of the concentration of media data elements;

transmitting the concentration of media data elements for broadcasting based on the predicted future inventory quantities;

receiving, at the graphical user interface, an input by the user that adjusts one or more of the properties related to the combined effects, the one or more properties comprising an advertising budget or advertising weight;

automatically modifying in real time, by the processor, the broadcasting of the concentration of media data elements based on optimizing the broadcasting to meet the adjusted one or more properties input by the user; and generating, for the graphical user interface, an updated dynamic report that displays the updated combined effects of the automatically modified broadcasting, based on updated viewer data of the product or service.

20. The system of claim 19, wherein the multi-dimensional model is a two-dimensional model.

* * * * *